US012163655B2

(12) United States Patent
Hozumi et al.

(10) Patent No.: US 12,163,655 B2
(45) Date of Patent: Dec. 10, 2024

(54) POWER TOOL

(71) Applicant: MAKITA CORPORATION, Anjo (JP)

(72) Inventors: Akihiro Hozumi, Anjo (JP); Makoto Chikaraishi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/303,720

(22) Filed: Apr. 20, 2023

(65) Prior Publication Data

US 2023/0366536 A1 Nov. 16, 2023

(30) Foreign Application Priority Data

May 11, 2022 (JP) ................................. 2022-078088

(51) Int. Cl.

| | |
|---|---|
| ***F21V 33/00*** | (2006.01) |
| ***B25F 5/00*** | (2006.01) |
| ***B25F 5/02*** | (2006.01) |
| ***F21V 9/32*** | (2018.01) |
| ***F21V 23/00*** | (2015.01) |
| *B25B 21/02* | (2006.01) |
| *F21Y 103/33* | (2016.01) |

(52) U.S. Cl.

CPC .......... *F21V 33/0084* (2013.01); *B25F 5/001* (2013.01); *B25F 5/02* (2013.01); *F21V 9/32* (2018.02); *F21V 23/002* (2013.01); *B25B 21/02* (2013.01); *F21Y 2103/33* (2016.08)

(58) Field of Classification Search

CPC ........ B25F 5/02; B25F 5/001; F21V 33/0084; F21V 9/32

See application file for complete search history.

(56) References Cited

U.S. PATENT DOCUMENTS

| | | | | | |
|---|---|---|---|---|---|
| 6,033,087 | A * | 3/2000 | Shozo | F21V 5/04 | 362/244 |
| 9,028,088 | B2 * | 5/2015 | Vanko | B25F 5/00 | 362/120 |
| 2010/0149790 | A1 * | 6/2010 | Leong | B25F 5/021 | 362/119 |
| 2011/0058356 | A1 * | 3/2011 | Friedman | B25F 5/021 | 362/119 |
| 2011/0235309 | A1 * | 9/2011 | Miki | C09K 11/7734 | 313/483 |
| 2012/0119234 | A1 * | 5/2012 | Shioi | C09K 11/7734 | 257/E33.059 |
| 2016/0354889 | A1 * | 12/2016 | Ely | B23Q 17/2404 | |
| 2021/0222866 | A1 * | 7/2021 | Niwa | F21V 33/008 | |

* cited by examiner

*Primary Examiner* — Andrew M Tecco
*Assistant Examiner* — Nicholas E Igbokwe
(74) *Attorney, Agent, or Firm* — Oliff PLC

(57) ABSTRACT

A power tool includes a motor, an output shaft, a chip-on-board light emitting diode, and a light cover. The output shaft is rotated by a rotational force of the motor. The chip-on-board light emitting diode is disposed around the output shaft. The chip-on-board light emitting diode includes: a substrate including a circular ring portion; and an LED chip disposed on a front surface of the circular ring portion. The light cover is fixed to the substrate. The light cover includes: an outer cylindrical portion disposed radially outside with respect to the circular ring portion; and a light transmission portion through which light emitted from the LED chip passes. An opening is provided in a lower portion of the outer cylindrical portion.

20 Claims, 17 Drawing Sheets

POWER TOOL

CROSS-REFERENCE

The present application claims priority to and incorporates by reference the entire contents of Japanese Patent Application No. 2022-078088 filed in Japan on May 11, 2022.

TECHNICAL FIELD

The technology disclosed in the present specification relates to a power tool.

BACKGROUND ART

In the technical field related to power tools, a known illumination system for a power tool is disclosed in US 2016/0354889 A.

In US 2016/0354889 A, the illumination system for a power tool includes a chip-on-board light emitting diode (COB LED). When at least a part of the chip-on-board light emitting diode is left wet with liquid, the chip-on-board light emitting diode may malfunction or fail.

An object of the present disclosure is to disclose techniques for preventing a chip-on-board light emitting diode from being affected by a liquid or the like.

SUMMARY OF THE INVENTION

In one non-limiting aspect of the present disclosure, a power tool may include: a motor; an output shaft that is rotated by a rotational force of the motor; a chip-on-board light emitting diode that is disposed around the output shaft, and includes a substrate including a circular ring portion and an LED chip disposed on a front surface of the circular ring portion; and a light cover that is fixed to the substrate, and includes an outer cylindrical portion disposed radially outside with respect to the circular ring portion and a light transmission portion through which light emitted from the LED chip passes. An opening may be provided in a lower portion of the outer cylindrical portion.

DETAILED DESCRIPTION OF THE INVENTION

Figure 1:
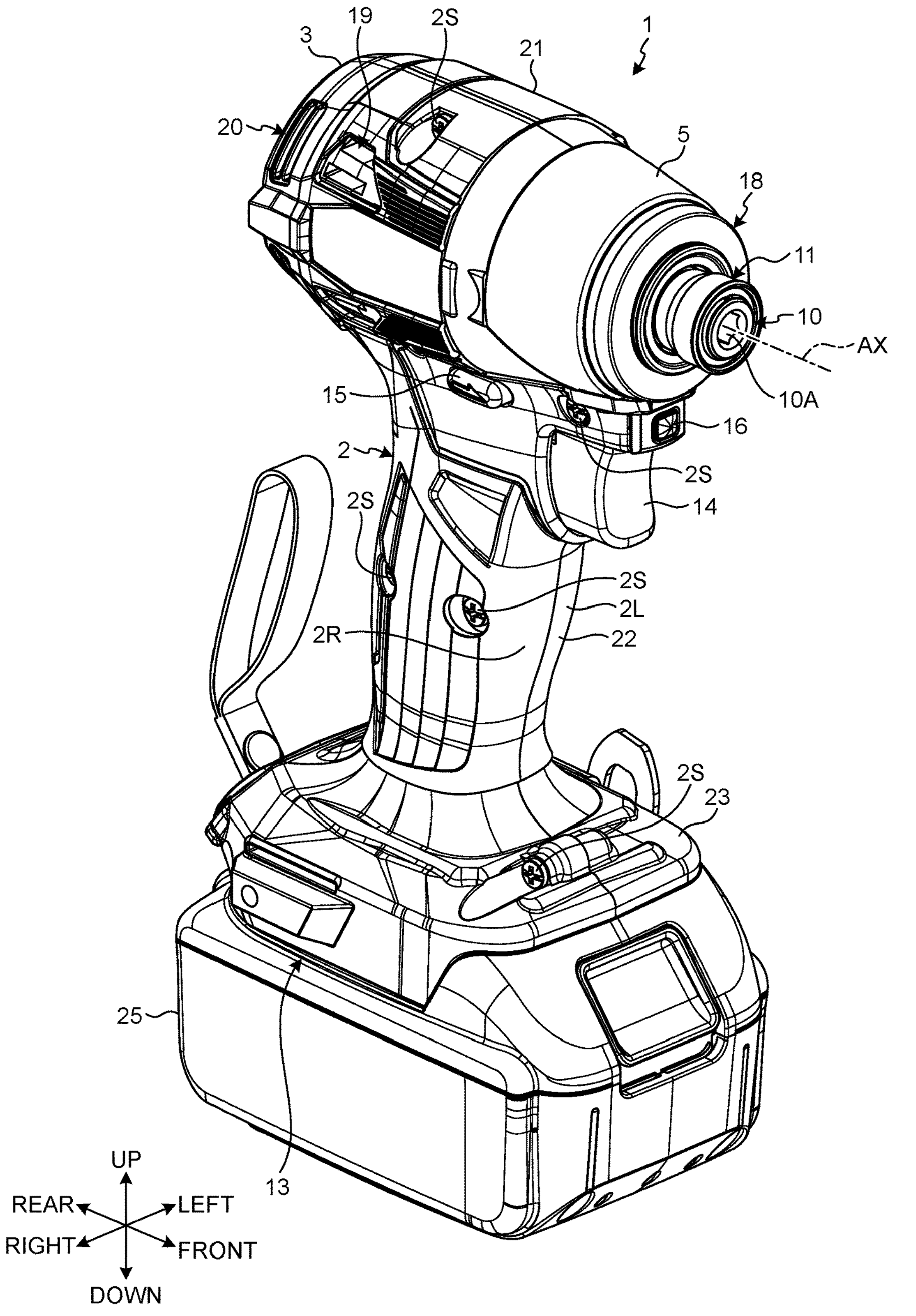
FIG. 1 is an oblique view, viewed from the front, which illustrates a power tool according to a first embodiment.

In one or more embodiments, the power tool may include: a motor; an output shaft that is rotated by a rotational force of the motor; a chip-on-board light emitting diode that is disposed around the output shaft, and includes a substrate including a circular ring portion and an LED chip disposed on a front surface of the circular ring portion; and a light cover that is fixed to the substrate, and includes an outer cylindrical portion disposed radially outside with respect to the circular ring portion and a light transmission portion through which light emitted from the LED chip passes. An opening may be provided in a lower portion of the outer cylindrical portion.

According to the above configuration, in a case where a liquid enters the inside of the outer cylindrical portion of the light cover, the liquid is discharged from the opening provided in the lower portion of the outer cylindrical portion. Therefore, the chip-on-board light emitting diode is prevented from being left wet with liquid, and the chip-on-board light emitting diode is prevented from being affected by liquid or the like. Therefore, occurrence of malfunction or failure of the chip-on-board light emitting diode is suppressed.

In one or more embodiments, the substrate may include a support portion protruding downward from a lower portion of the circular ring portion. The light cover may include a protrusion protruding downward from a lower portion of the outer cylindrical portion and facing at least a part of the support portion. The opening may be provided in the protrusion.

According to the above configuration, the liquid that has entered the inside of the outer cylindrical portion is discharged from the opening provided in the protrusion.

In one or more embodiments, the protrusion may include: a front protrusion facing a front surface of the support portion; a left protrusion facing a left surface of the support portion; and a right protrusion facing a right surface of the support portion. The opening may be defined by the front protrusion, the left protrusion, and the right protrusion.

According to the above configuration, the liquid that has entered the inside of the outer cylindrical portion flows through at least a part of a rear surface of the front protrusion, a right surface of the left protrusion, and a left surface of the right protrusion, and is discharged from the opening.

In one or more embodiments, each of a right surface of the left protrusion and a left surface of the right protrusion may be connected to an inner circumferential surface of the outer cylindrical portion.

According to the above configuration, the liquid that has entered the inside of the outer cylindrical portion flows on the inner circumferential surface of the outer cylindrical portion, then flows on at least a part of the right surface of the left protrusion and the left surface of the right protrusion, and is discharged from the opening.

In one or more embodiments, the front surface of the circular ring portion may face a light entrance surface of the light transmission portion. The light cover may include a projection projecting rearward from the light entrance surface. A part of the front surface of the circular ring portion may be in contact with the projection.

According to the above configuration, since a part of the front surface of the circular ring portion is in contact with the projection, the front surface of the circular ring portion and the light entrance surface of the light transmission portion face each other with a gap interposed therebetween. Since the front surface of the circular ring portion is not in contact with the light entrance surface of the light transmission portion, the liquid that has entered between the front surface of the circular ring portion and the light entrance surface of the light transmission portion can flow toward the opening without staying between the front surface of the circular ring portion and the light entrance surface of the light transmission portion.

In one or more embodiments, the light cover may include an inner cylindrical portion disposed radially inside with respect to the circular ring portion. The light transmission portion may be disposed so as to connect a front end portion of the outer cylindrical portion and a front end portion of the inner cylindrical portion.

According to the above configuration, since the outer cylindrical portion of the light cover is disposed radially outside with respect to the circular ring portion and the inner cylindrical portion of the light cover is disposed radially inside with respect to the circular ring portion, the connection between the substrate and the light cover is stabilized.

In one or more embodiments, the light cover may include a support protrusion protruding radially outward from an outer circumferential surface of the inner cylindrical portion. A part of an inner circumferential surface of the circular ring portion may be in contact with the support protrusion.

According to the above configuration, a part of the inner circumferential surface of the circular ring portion comes into contact with the support protrusion, whereby the inner circumferential surface of the circular ring portion and the outer circumferential surface of the inner cylindrical portion face each other with a gap interposed therebetween. Since the inner circumferential surface of the circular ring portion and the outer circumferential surface of the inner cylindrical portion are not in contact with each other, the liquid that has entered between the inner circumferential surface of the circular ring portion and the outer circumferential surface of the inner cylindrical portion can flow toward the opening without staying between the inner circumferential surface of the circular ring portion and the outer circumferential surface of the inner cylindrical portion.

In one or more embodiments, the power tool may include: a speed reduction mechanism configured to transmit a rotational force of the motor to the output shaft; and a gear case that accommodates therein the speed reduction mechanism. The gear case may include a rear cylindrical portion that accommodates therein the speed reduction mechanism, a front cylindrical portion that holds a bearing that supports the output shaft, and an annular portion that connects a front end portion of the rear cylindrical portion and a rear end portion of the front cylindrical portion. The chip-on-board light emitting diode may be disposed around the front cylindrical portion. The inner cylindrical portion may be disposed around the front cylindrical portion and fixed to the front cylindrical portion.

According to the above configuration, the chip-on-board light emitting diode is fixed to the front cylindrical portion of the gear case via the light cover.

In one or more embodiments, the front cylindrical portion may include a protrusion protruding radially outward from an outer circumferential surface of the front cylindrical portion. The inner cylindrical portion may include a recess in which the case protrusion is disposed.

According to the above configuration, the chip-on-board light emitting diode is fixed to the front cylindrical portion of the gear case via the light cover.

In one or more embodiments, the output shaft may include an anvil. The power tool may include an impact mechanism to which a rotational force of the motor is transmitted via the speed reduction mechanism and that impacts the anvil in a rotation direction. The gear case may be a hammer case that accommodates therein the speed reduction mechanism and the impact mechanism.

According to the above configuration, the chip-on-board light emitting diode is applied to an impact tool.

In one or more embodiments, the chip-on-board light emitting diode may include a phosphor that covers the LED chip and an electrode connected to a power supply via a lead wire. The phosphor may cover the electrode.

According to the above configuration, since the LED chip and the electrode are covered with the phosphor, contact between each of the LED chip and the electrode and a liquid is suppressed. That is, the LED chip and the electrode are waterproofed by the phosphor.

In one or more embodiments, the power tool may include: a motor; an output shaft that is rotated by a rotational force of the motor; and a chip-on-board light emitting diode disposed around the output shaft. The chip-on-board light emitting diode may include a substrate, an LED chip disposed on the substrate, a phosphor that covers the LED chip, and an electrode connected to a power supply via a lead wire. The phosphor may cover the electrode.

According to the above configuration, since the LED chip and the electrode are covered with the phosphor, contact between each of the LED chip and the electrode and a liquid is suppressed. That is, the LED chip and the electrode are waterproofed by the phosphor. Since wetting of the chip-on-board light emitting diode with liquid is suppressed, occurrence of malfunction or failure of the chip-on-board light emitting diode is suppressed.

In one or more embodiments, the LED chip and the electrode may be disposed on a front surface of the substrate.

According to the above configuration, the LED chip and the electrode can be waterproofed by the phosphor provided on the front surface of the substrate without providing the phosphor on a rear surface of the substrate.

In one or more embodiments, the chip-on-board light emitting diode may include a bank protruding forward from a front surface of the substrate and defining a compartment space in which the phosphor is disposed. The LED chip and the electrode may be disposed on an inner side of the bank.

According to the above configuration, the phosphor is disposed in the compartment space, which is defined on the inner side of the bank. Since the LED chip and the electrode are disposed on the inner side of the bank and the phosphor is disposed on the inner side of the bank, the LED chip and the electrode are waterproofed by the phosphor.

In one or more embodiments, the substrate may include a circular ring portion. The bank may include: a circular ring shaped first bank provided on a front surface of the circular ring portion; and a circular ring shaped second bank provided radially outside with respect to the first bank on the front surface of the circular ring portion. The LED chip and the electrode may be disposed between the first bank and the second bank. The phosphor may be disposed to cover each of the LED chip and the electrode between the first bank and the second bank.

According to the above configuration, the phosphor is disposed in a circular ring shaped compartment space defined by the first bank and the second bank. Since the LED chip and the electrode are disposed between the first bank and the second bank, the phosphor is disposed between the first bank and the second bank, whereby the LED chip and the electrode are waterproofed by the phosphor.

In one or more embodiments, the lead wire may be connected to the electrode from a rear surface of the circular ring portion via a through hole provided in the circular ring portion.

According to the above configuration, the lead wire is not disposed on the front surface of the circular ring portion but is disposed so as to protrude rearward from the rear surface of the circular ring portion. Therefore, the phosphor can cover the LED chip and the electrode without being blocked by the lead wire.

In one or more embodiments, the substrate may include a support portion protruding downward from a lower portion of the circular ring portion. At least a part of the lead wire may be supported by a rear surface of the support portion.

According to the above configuration, since the lead wire is supported by the rear surface of the support portion, unnecessary movement of the lead wire is suppressed. Therefore, deterioration of the lead wire is suppressed.

In one or more embodiments, the power tool may include a light cover that includes: an outer cylindrical portion disposed radially outside with respect to the circular ring portion; an inner cylindrical portion disposed radially inside with respect to the circular ring portion; a light transmission portion disposed so as to connect a front end portion of the outer cylindrical portion and a front end portion of the inner cylindrical portion and through which light emitted from the LED chip passes; and a protrusion protruding downward from a lower portion of the outer cylindrical portion. The protrusion may include a housing portion in which the support portion is disposed.

According to the above configuration, since the support portion of the substrate is housed in the housing portion of the light cover, the connection between the substrate and the light cover is stabilized.

In one or more embodiments, the protrusion may be provided with a notch in which the lead wire is disposed.

According to the above configuration, since the lead wire is disposed in the notch, unnecessary movement of the lead wire is suppressed. Therefore, deterioration of the lead wire is suppressed.

In one or more embodiments, a plurality of the LED chips may be arranged at intervals in a circumferential direction of the circular ring portion.

According to the above configuration, the chip-on-board light emitting diode can brightly illuminate a work target.

Hereinafter, embodiments will be described with reference to the drawings. In the embodiments, a positional relationships among parts will be described using the terms "left", "right", "front", "rear", "up", and "down". These terms indicate the relative positions or directions, using the center of a power tool as a reference.

First Embodiment

Power Tool

Figure 2:
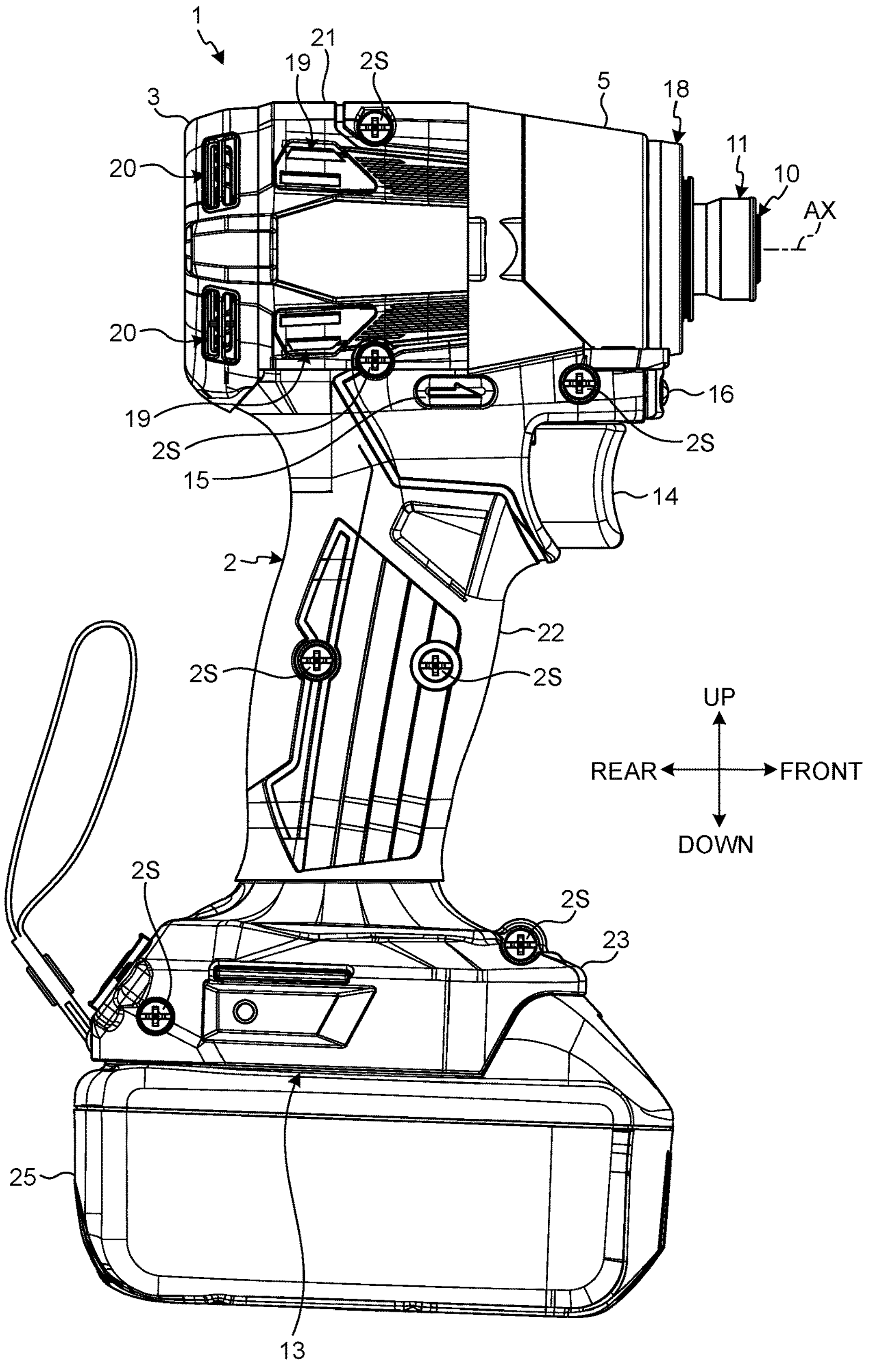
FIG. 2 is a side view illustrating the power tool according to the first embodiment.
Figure 3:
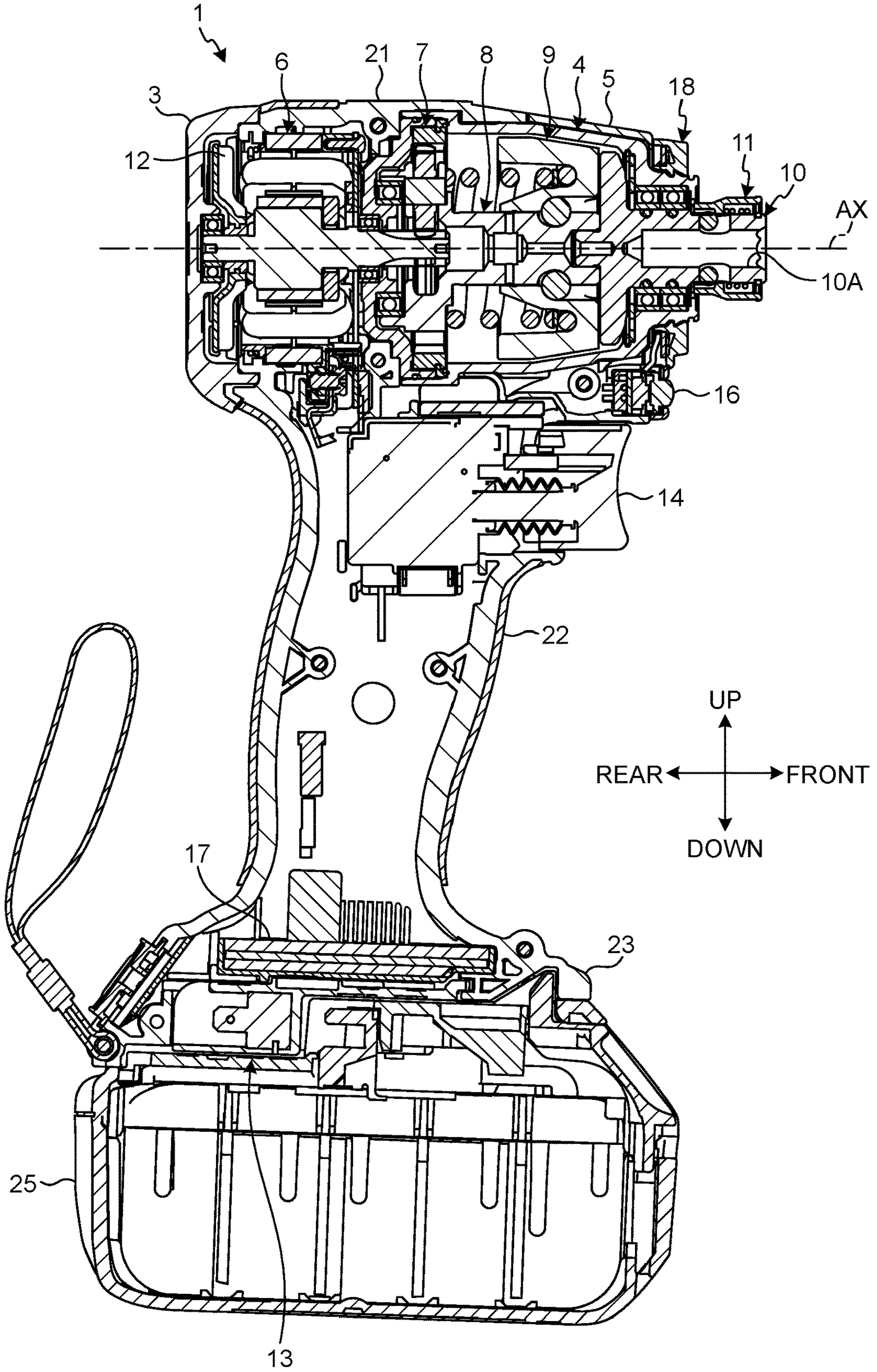
FIG. 3 is a cross-sectional view illustrating the power tool according to the first embodiment.
Figure 4:
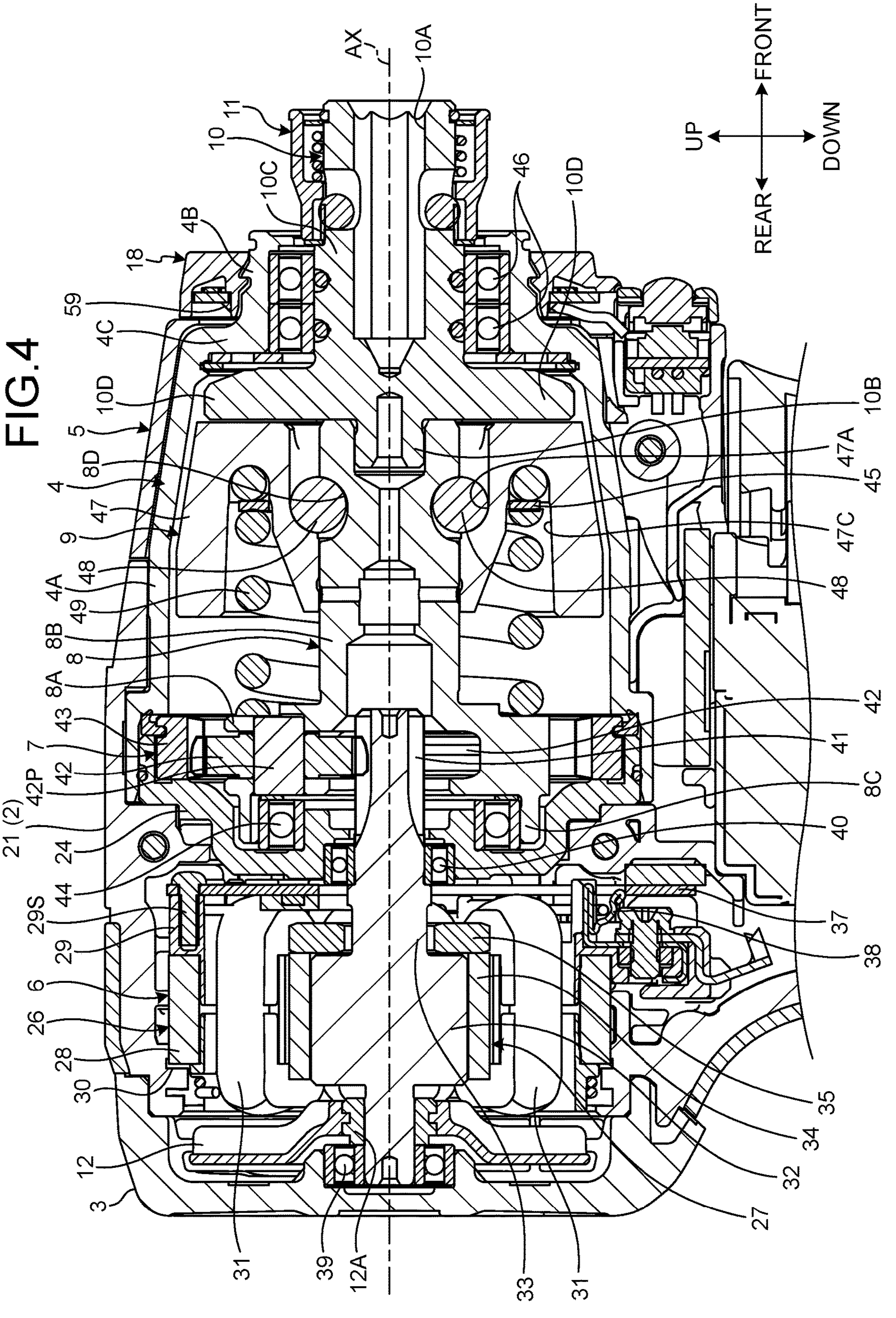
FIG. 4 is a cross-sectional view illustrating an upper portion of the power tool according to the first embodiment.

FIG. 1 is an oblique view, viewed from the front, which illustrates a power tool 1 according to the present embodiment. FIG. 2 is a side view illustrating the power tool 1 according to the present embodiment. FIG. 3 is a cross-sectional view illustrating the power tool 1 according to the present embodiment. FIG. 4 is a cross-sectional view illustrating an upper portion of the power tool 1 according to the present embodiment.

In the present embodiment, the power tool 1 is a power tool having an electric motor 6 as a power source. A direction parallel to a rotation axis AX of the motor 6 is appropriately referred to as an axial direction, a direction around the rotation axis AX is appropriately referred to as a circumferential direction or a rotation direction, and a radial direction of the rotation axis AX is appropriately referred to as a radial direction. In the radial direction, a position close to or a direction approaching the rotation axis AX is appropriately referred to as radially inward, and a position far from or a direction away from the rotation axis AX is appropriately referred to as radially outward. In the present embodiment, the rotation axis AX extends in a front-rear direction. One side in the axial direction is a front side, and the other side in the axial direction is a rear side.

In the present embodiment, the power tool 1 is assumed to be an impact tool which is a type of power tool. In the following description, the power tool 1 is appropriately referred to as an impact tool 1.

In the present embodiment, the impact tool 1 is an impact driver which is a type of screw fastening tool. The impact tool 1 includes a housing 2, a rear cover 3, a hammer case 4, a case cover 5, the motor 6, a speed reduction mechanism 7, a spindle 8, an impact mechanism 9, an anvil 10, a tool holding mechanism 11, a fan 12, a battery mounting unit 13, a trigger lever 14, a forward/reverse switching lever 15, a hand mode switching button 16, a controller 17, and a light unit 18.

The housing 2 is made of synthetic resin. In the present embodiment, the housing 2 is made of nylon. The housing 2 includes a left housing 2L and a right housing 2R disposed on a right side of the left housing 2L. The left housing 2L and the right housing 2R are fixed by a plurality of screws 2S. The housing 2 includes a pair of half-split housings.

The housing 2 includes a motor housing portion 21, a grip portion 22, and a battery holder 23.

The motor housing portion 21 has a cylindrical shape. The motor housing portion 21 houses therein the motor 6, a part of a bearing box 24, and a rear portion of the hammer case 4.

The grip portion 22 protrudes downward from the motor housing portion 21. The trigger lever 14 is provided above the grip portion 22. The grip portion 22 is held by an operator.

The battery holder 23 is connected to a lower end portion of the grip portion 22. In each of the front-rear direction and the left-right direction, an outer dimension of the battery holder 23 is larger than an outer dimension of the grip portion 22.

The rear cover 3 is made of synthetic resin. The rear cover 3 is disposed rearward of the motor housing portion 21. The rear cover 3 houses at least a part of the fan 12. The fan 12 is disposed on an inner-circumference side of the rear cover 3. The rear cover 3 is disposed such that it covers an opening in a rear end portion of the motor housing portion 21.

The motor housing portion 21 has air-intake ports 19. The rear cover 3 has air-exhaust ports 20. Air from outside of the housing 2 flows into an interior space of the housing 2 via the air-intake ports 19. Air from the interior space of the housing 2 flows out to the outside of the housing 2 via the air-exhaust ports 20.

The hammer case 4 functions as a gear case that accommodates therein the speed reduction mechanism 7. The hammer case 4 accommodates therein at least a part of the speed reduction mechanism 7, the spindle 8, the impact mechanism 9, and the anvil 10. The hammer case 4 is made of a metal. In the present embodiment, the hammer case 4 is made of aluminum. The hammer case 4 has a cylindrical shape.

The hammer case 4 includes a rear cylindrical portion 4A, a front cylindrical portion 4B, and an annular portion 4C. The front cylindrical portion 4B is disposed in front of the rear cylindrical portion 4A. An outer diameter of the rear cylindrical portion 4A is larger than an outer diameter of the front cylindrical portion 4B. An inner diameter of the rear cylindrical portion 4A is larger than an inner diameter of the front cylindrical portion 4B. The annular portion 4C is disposed so as to connect a front end portion of the rear cylindrical portion 4A and a rear end portion of the front cylindrical portion 4B.

The hammer case 4 is connected to a front portion of the motor housing portion 21. The bearing box 24 is fixed to a rear portion of the rear cylindrical portion 4A. At least a part of the speed reduction mechanism 7 is disposed inside the bearing box 24. A screw thread is formed on an outer-circumferential portion of the bearing box 24. A screw groove is formed in an inner-circumferential portion of the rear portion of the rear cylindrical portion 4A. The bearing box 24 and the hammer case 4 are fixed to one another by joining the screw thread of the bearing box 24 and the screw groove of the rear cylindrical portion 4A. The hammer case 4 is sandwiched between the left housing 2L and the right housing 2R. A part of the bearing box 24 and the rear portion of the rear cylindrical portion 4A are housed in the motor housing portion 21. The bearing box 24 is fixed to the motor housing portion 21 and the hammer case 4.

The case cover 5 covers at least a part of a surface of the hammer case 4. In the present embodiment, the case cover 5 covers a surface of the rear cylindrical portion 4A. The case cover 5 is made of synthetic resin. In the present embodiment, the case cover 5 is made of polycarbonate resin. The case cover 5 protects the hammer case 4. The case cover 5 blocks contact between the hammer case 4 and an object around the impact tool 1. The case cover 5 blocks contact between the hammer case 4 and the operator.

The motor 6 is a power source of the impact tool 1. The motor 6 generates a rotational force. The motor 6 is an electric motor. The motor 6 is an inner-rotor-type brushless motor. The motor 6 includes a stator 26 and a rotor 27. The stator 26 is supported by the motor housing portion 21. At least a part of the rotor 27 is disposed inside the stator 26. The rotor 27 rotates relative to the stator 26. The rotor 27 rotates about the rotation axis AX extending in the front-rear direction.

The stator 26 includes a stator core 28, a front insulator 29, a rear insulator 30, and coils 31.

The stator core 28 is disposed radially outside with respect to the rotor 27. The stator core 28 includes a plurality of laminated steel plates. The steel plates are plates made of a metal containing iron as a main component. The stator core 28 has cylindrical shape. The stator core 28 includes teeth that respectively support the coils 31.

The front insulator 29 is provided at a front portion of the stator core 28. The rear insulator 30 is provided at a rear portion of the stator core 28. The front insulator 29 and the rear insulator 30 each are an electrically insulating member made of a synthetic resin. The front insulator 29 is disposed so as to cover some of the teeth surfaces. The rear insulator 30 is disposed so as to cover some of the teeth surfaces.

The coils 31 are mounted on the stator core 28 via the front insulator 29 and the rear insulator 30. The coils 31 are disposed around the teeth of the stator core 28 via the front insulator 29 and the rear insulator 30. The coils 31 and the stator core 28 are electrically insulated from one another by the front insulator 29 and the rear insulator 30. The coils 31 are electrically connected via a fusing terminal 38.

The rotor 27 rotates about the rotation axis AX. The rotor 27 includes a rotor core portion 32, a rotor shaft portion 33, at least one rotor magnet 34, and at least one sensor magnet 35.

The rotor core portion 32 and the rotor shaft portion 33 each are made of steel. In the present embodiment, the rotor core portion 32 and the rotor shaft portion 33 are integrated. A front portion of the rotor shaft portion 33 protrudes forward from a front end surface of the rotor core portion 32. A rear portion of the rotor shaft portion 33 protrudes rearward from a rear end surface of the rotor core portion 32.

The rotor magnet 34 is fixed to the rotor core portion 32. The rotor magnet 34 has a cylindrical shape. The rotor magnet 34 is disposed around the rotor core portion 32.

The sensor magnet 35 is fixed to the rotor core portion 32. The sensor magnet 35 has a circular ring shape. The sensor magnet 35 is disposed on the front end surface of the rotor core portion 32 and the front end surface of the rotor magnet 34.

A sensor substrate 37 is mounted on the front insulator 29. The sensor substrate 37 is fixed to the front insulator 29 by at least one screw 29S. The sensor substrate 37 includes a circular circuit board and a magnetic sensor supported by the circuit board. At least a part of the sensor substrate 37 faces the sensor magnet 35. The magnetic sensor detects a position of the sensor magnet 35 to detect a position of the rotor 27 in the rotation direction.

The rear portion of the rotor shaft portion 33 is rotatably supported by a rotor bearing 39. The front portion of the rotor shaft portion 33 is rotatably supported by a rotor bearing 40. The rotor bearing 39 is held by the rear cover 3. The rotor bearing 40 is held by the bearing box 24. The front end portion of the rotor shaft portion 33 is disposed in the interior space of the hammer case 4 through an opening of the bearing box 24.

A pinion gear 41 is formed at a front end portion of the rotor shaft portion 33. The pinion gear 41 is connected to at least a part of the speed reduction mechanism 7. The rotor shaft portion 33 is connected to the speed reduction mechanism 7 via the pinion gear 41.

The speed reduction mechanism 7 transmits a rotational force of the motor 6 to the spindle 8 and the anvil 10. The speed reduction mechanism 7 is accommodated in the rear cylindrical portion 4A of the hammer case 4. The speed reduction mechanism 7 includes a plurality of gears. The speed reduction mechanism 7 is disposed forward of the motor 6. The speed reduction mechanism 7 connects the rotor shaft portion 33 and the spindle 8. The gears of the speed reduction mechanism 7 are driven by the rotor 27. The speed reduction mechanism 7 transmits the rotation of the rotor 27 to the spindle 8. The speed reduction mechanism 7 causes the spindle 8 to rotate at a rotation speed that is lower than a rotation speed of the rotor shaft portion 33. The speed reduction mechanism 7 includes a planetary gear mechanism.

The speed reduction mechanism 7 includes a plurality of planetary gears 42 disposed around the pinion gear 41, and an internal gear 43 disposed around the plurality of planetary gears 42. The pinion gear 41, the planetary gears 42, and the internal gear 43 are each housed in the hammer case 4 and the bearing box 24. Each of the planetary gears 42 meshes with the pinion gear 41. The planetary gears 42 are rotatably supported on the spindle 8 via pins 42P. The spindle 8 is rotated by the planetary gears 42. The internal gear 43 has internal teeth, which mesh with the planetary gears 42. The internal gear 43 is fixed to the bearing box 24. The internal gear 43 is always non-rotatable relative to the bearing box 24.

When the rotor shaft portion 33 rotates in response to the driving of the motor 6, the pinion gear 41 rotates, and the planetary gears 42 revolve around the pinion gear 41. The planetary gears 42 revolve while meshing with the internal teeth of the internal gear 43. Owing to the revolving of the planetary gears 42, the spindle 8, which is connected to the planetary gears 42 via the pin 42P, rotates at a rotation speed that is lower than a rotation speed of the rotor shaft portion 33.

The spindle 8 is rotated by the rotational force of the motor 6. The spindle 8 is disposed forward of at least a part of the motor 6. The spindle 8 is disposed forward of the stator 26. At least a part of the spindle 8 is disposed forward of the rotor 27. At least a part of the spindle 8 is disposed forward of the speed reduction mechanism 7. The spindle 8 is rotated by the rotor 27. The spindle 8 is rotated by a rotational force of the rotor 27 transmitted by the speed reduction mechanism 7.

The spindle 8 includes a flange portion 8A and a spindle shaft portion 8B protruding forward from the flange portion 8A. The planetary gears 42 are rotatably supported by the flange portion 8A via the pins 42P. A rotation axis of the spindle 8 and the rotation axis AX of the motor 6 coincide with one another. The spindle 8 rotates about the rotation axis AX.

The spindle 8 is rotatably supported by a spindle bearing 44. The spindle bearing 44 is held by the bearing box 24. The spindle 8 has a circular ring portion 8C protruding rearward from a rear portion of the flange portion 8A. The spindle bearing 44 is disposed inside the circular ring portion 8C. In the present embodiment, an outer ring of the spindle bearing 44 is connected to the circular ring portion 8C, and an inner ring of the spindle bearing 44 is supported by the bearing box 24.

The impact mechanism 9 is driven by the motor 6. The rotational force of the motor 6 is transmitted to the impact mechanism 9 via the speed reduction mechanism 7 and the spindle 8. The impact mechanism 9 impacts the anvil 10 in the rotation direction owing to the rotational force of the spindle 8, which is rotated by the motor 6. The impact mechanism 9 includes a hammer 47, balls 48, and a coil spring 49. The impact mechanism 9 including the hammer 47 is housed in the hammer case 4.

The hammer 47 is disposed forward of the speed reduction mechanism 7. The hammer 47 is accommodated in the rear cylindrical portion 4A. The hammer 47 is disposed around the spindle shaft portion 8B. The hammer 47 is held by the spindle shaft portion 8B. The balls 48 are disposed between the spindle shaft portion 8B and the hammer 47. The coil spring 49 is supported by the flange portion 8A and the hammer 47.

The hammer 47 is rotated by the motor 6. The rotational force of the motor 6 is transmitted to the hammer 47 via the speed reduction mechanism 7 and the spindle 8. The hammer 47 is rotatable together with the spindle 8 owing to the rotational force of the spindle 8, which is rotated by the motor 6. A rotation axis of the hammer 47, the rotation axis of the spindle 8, and the rotation axis AX of the motor 6 coincide with one another. The hammer 47 rotates about the rotation axis AX.

The balls 48 are made of a metal such as steel. The balls 48 are disposed between the spindle shaft portion 8B and the hammer 47. The spindle 8 has a spindle groove 8D in which at least a part of the ball 48 is disposed. The spindle groove 8D is provided on a part of an outer surface of the spindle shaft portion 8B. The hammer 47 has a hammer groove 47A in which at least a part of the ball 48 is disposed. The hammer groove 47A is provided on a part of an inner surface of the hammer 47. The balls 48 are disposed between the spindle groove 8D and the hammer groove 47A. The balls 48 can roll along the inner side of the spindle groove 8D and the inner side of the hammer groove 47A. The hammer 47 is movable as the balls 48 roll. The spindle 8 and the hammer 47 can move relative to one another in the axial direction and the rotation direction within movable ranges defined by the spindle groove 8D and the hammer groove 47A.

The coil spring 49 generates an elastic (spring) force, which causes the hammer 47 to move forward. The coil spring 49 is disposed between the flange portion 8A and the hammer 47. A ring-shaped recess 47C is provided on a rear surface of the hammer 47. The recess 47C is recessed forward from the rear surface of the hammer 47. A washer 45 is provided on an inner side of the recess 47C. A rear end portion of the coil spring 49 is supported by the flange portion 8A. A front end portion of the coil spring 49 is disposed on the inner side of the recess 47C and is supported by the washer 45.

The anvil 10 is an output shaft of the impact tool 1 that rotates by the rotational force of the motor 6. At least a part of the anvil 10 is disposed forward of the hammer 47. The anvil 10 has a tool (bit) hole 10A into which a tool accessory, e.g., a bit, is inserted. The tool hole 10A is provided at a front end portion of the anvil 10. The tool accessory is mounted on the anvil 10. Furthermore, a protrusion 10B is provided at a rear end portion of the anvil 10. A recess is provided at a front end portion of the spindle shaft portion 8B. The protrusion 10B is inserted into the recess provided at the front end portion of the spindle shaft portion 8B.

The anvil 10 includes a rod-shaped anvil shaft portion 10C and an anvil projection 10D. The tool hole 10A is provided in a front end portion of the anvil shaft portion 10C. The tool accessory is mounted in (on) the anvil shaft portion 10C. The anvil projection 10D is provided at a rear end portion of the anvil 10. The anvil projection 10D projects radially outward from a rear end portion of the anvil shaft portion 10C.

The anvil 10 is rotatably supported by an anvil bearings 46. A rotation axis of the anvil 10, the rotation axis of the hammer 47, the rotation axis of the spindle 8, and the rotation axis AX of the motor 6 coincide with one another. The anvil 10 rotates about the rotation axis AX. The anvil bearings 46 are disposed in the interior of the front cylindrical portion 4B. The anvil bearings 46 are held by the front cylindrical portion 4B of the hammer case 4. The anvil bearings 46 support the anvil shaft portion 10C. In the present embodiment, two anvil bearings 46 are disposed in the front-rear direction.

At least a part of the hammer 47 is capable of coming into contact with the anvil projection 10D. A hammer projection projecting forward is provided at a front portion of the hammer 47. The hammer projection of the hammer 47 and the anvil projection 10D are capable of coming into contact with one another. When the motor 6 is driven (supplied with current) in a state where the hammer 47 and the anvil projection 10D are in contact with one another, the anvil 10 rotates together with the hammer 47 and the spindle 8.

The anvil 10 is impactable (strikable) in the rotation direction by the hammer 47. For example, during screw-fastening work, there are situations in which, when a load that acts on the anvil 10 becomes high, the anvil 10 can no longer be caused to rotate merely by the power generated by the motor. When the anvil 10 can no longer be caused to rotate merely by the power generated by the motor 6, the rotation of the anvil 10 and the hammer 47 will (temporarily) stop. As a result, the spindle 8 and the hammer 47 will move relative to one another in the axial direction and the circumferential direction via the balls 48. That is, even when the rotation of the hammer 47 (temporarily) stops, the rotation of the spindle 8 continues owing to the power generated by the motor 6. In the state where the rotation of the hammer 47 has stopped, when the spindle 8 rotates relative to the hammer 47, the balls 48 move rearward while being guided by the spindle groove 8D and the hammer groove 47A. The hammer 47 receives a force from the balls 48 and moves rearward along with the balls 48. That is, in a state where the rotation of the anvil 10 is stopped, the hammer 47 moves rearward in response to the rotation of the spindle 8. The contact between the hammer 47 and the anvil projection 10D is released by the movement of the hammer 47 rearward.

The coil spring 49 generates an elastic (spring) force, which causes the hammer 47 to move forward. The hammer 47, which had previously moved rearward, now moves forward owing to the elastic force of the coil spring 49. When the hammer moves forward, the hammer 47 receives a force in the rotation direction from the balls 48. That is, the hammer 47 moves forward while rotating. When the hammer 47 moves forward while rotating, the hammer 47 comes into contact with the anvil projection 10D while rotating. As a result, the anvil projection 10D is impacted in the rotation direction by the hammer 47. Both the power of the motor 6 and the inertial force of the hammer 47 act on the anvil 10. Therefore, the anvil 10 can be rotated about the rotation axis AX with a high torque.

The tool holding mechanism 11 is disposed around the front portion of the anvil 10. The tool holding mechanism 11 holds the tool accessory, which is inserted into the tool hole 10A.

The fan 12 is rotated by the rotational force of the motor 6. The fan 12 is disposed rearward of the stator 26 of the motor 6. The fan 12 generates an airflow for cooling the motor 6. The fan 12 is fixed to at least a part of the rotor 27. The fan 12 is fixed to the rear portion of the rotor shaft portion 33 via a bush 12A. The fan 12 is disposed between the rotor bearing 39 and the stator 26. The fan 12 rotates when the rotor 27 rotates. When the rotor shaft portion 33 rotates, the fan 12 rotates together with the rotor shaft portion 33. When the fan 12 rotates, air from outside of the housing 2 flows into the interior space of the housing 2 through the air-intake ports 19. The air that has flowed into the interior space of the housing 2 flows through the interior space of the housing 2, thereby cooling the motor 6. The air that has flowed through the interior space of the housing 2 flows out to the outside of the housing 2 via the air-exhaust ports 20 while the fan 12 is rotating.

The battery mounting unit 13 is disposed at a lower portion of the battery holder 23. The battery mounting unit 13 is connected to a battery pack 25. The battery pack 25 is mounted on the battery mounting unit 13. The battery pack 25 is detachable from the battery mounting unit 13. The battery pack 25 functions as a power supply of the impact tool 1. The battery pack 25 includes one or more secondary batteries. In the present embodiment, the battery pack 25 includes one or more rechargeable lithium-ion batteries. After being mounted on the battery mounting unit 13, the battery pack 25 can supply electric power to the impact tool 1. The motor 6 and the light unit 18 is driven based on the electric power (current) supplied from the battery pack 25.

The trigger lever 14 is provided on the grip portion 22. The trigger lever 14 is operated by an operator to start the motor 6. The motor 6 is changed between driving and stoppage in response to operating of the trigger lever 14.

The forward/reverse switching lever 15 is provided at an upper portion of the grip portion 22. The forward/reverse switching lever 15 is operated by an operator. In response to the operation of the forward/reverse switching lever 15, the rotation direction of the motor 6 is changed from one of a forward-rotational direction and a reverse-rotational direction to the other. When the rotation direction of the motor 6 is changed, the rotational direction of the spindle 8 is changed.

The hand mode switching button 16 is provided at an upper portion of the trigger lever 14. The hand mode switching button 16 can be operated (pressed) by an operator. A control mode of the motor 6 is changed in response to the operation of the hand mode switching button 16.

The controller 17 outputs control signals, which control at least the motor 6 and the light unit 18. The controller 17 is accommodated in the battery holder 23. The controller 17 changes the control mode of the motor 6 based on the work content required to be performed by the impact tool 1. The control mode of the motor 6 refers to a control method or a control pattern of the motor 6. The controller 17 includes a circuit board on which a plurality of electronic components are mounted. Examples of the electronic components mounted on the circuit board include: a processor such as a central processing unit (CPU); nonvolatile memory such as a read only memory (ROM) or storage; volatile memory such as a random access memory (RAM); transistors, and resistors.

Light Unit

The light unit 18 emits illumination light. The light unit 18 illuminates the anvil 10 and the periphery of the anvil 10 with illumination light. The light unit 18 illuminates the front of the anvil 10 with illumination light. Furthermore, the light unit 18 illuminates the tool accessory attached to the anvil 10 and the periphery of the tool accessory with illumination light.

The light unit 18 is disposed at the front portion of the hammer case 4. The light unit 18 is disposed around the front cylindrical portion 4B.

The light unit 18 includes a chip-on-board light emitting diode (COB LED).

Figure 5:
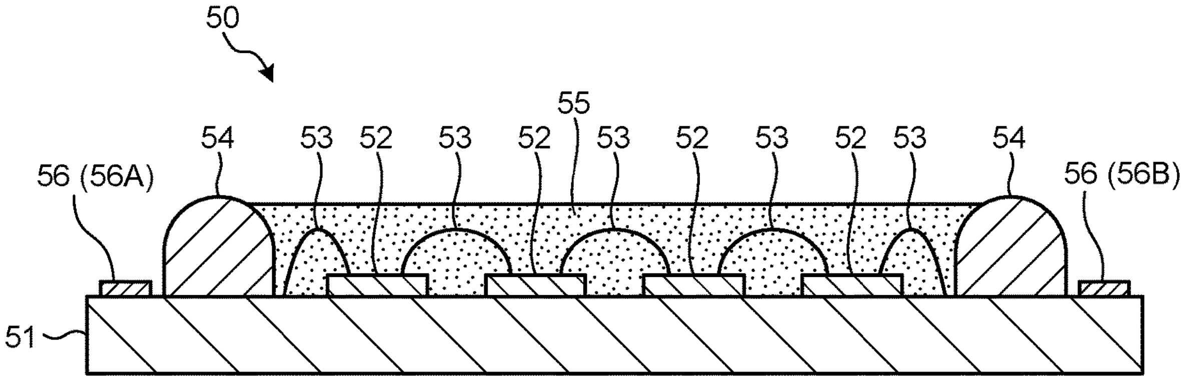
FIG. 5 is a diagram schematically illustrating a chip-on-board light emitting diode according to the first embodiment.

FIG. 5 is a diagram schematically illustrating a chip-on-board light emitting diode 50 according to the present embodiment. The chip-on-board light emitting diode 50 includes a substrate 51, LED chips 52, gold wires 53, a bank 54, a phosphor (phosphor coating) 55, and a pair of electrodes 56. Examples of the substrate 51 include: an aluminum substrate, a woven fiberglass reinforced epoxy substrate (FR-4 substrate), and a composite epoxy material substrate (CEM-3 substrate). The LED chips 52 are mounted on a surface of the substrate 51. The gold wires 53 connect the LED chips 52 and the substrate 51. The gold wires 53 connect the LED chips 52 to one another. The bank 54 is provided on the surface of the substrate 51. The bank 54 is disposed around the LED chips 52. The bank 54 defines a compartment space in which the phosphor 55 is disposed. The phosphor 55 is disposed on the inner side of the bank 54 so as to cover the LED chips 52. Each of the electrodes 56 is disposed on the surface of the substrate 51 on the outer side of the bank 54. The electrodes 56 may be disposed on a back surface of the substrate 51. Among the electrodes 56, one electrode 56 is a positive electrode 56A, and the other electrode 56 is a negative electrode 56B. The electrodes 56 are connected to the battery pack 25 via the controller 17 and lead wires. The power output from the battery pack 25 is supplied to the electrodes 56 via the controller 17 and the lead wires. The power supplied to the electrodes 56 is supplied to the LED chips 52 via the substrate 51 and the gold wires 53. The LED chips 52 emit light owing to the power supplied from the battery pack 25. A voltage, which has been stepped down to 5 V, of the battery pack 25 is applied to the LED chips 52.

Figure 6:
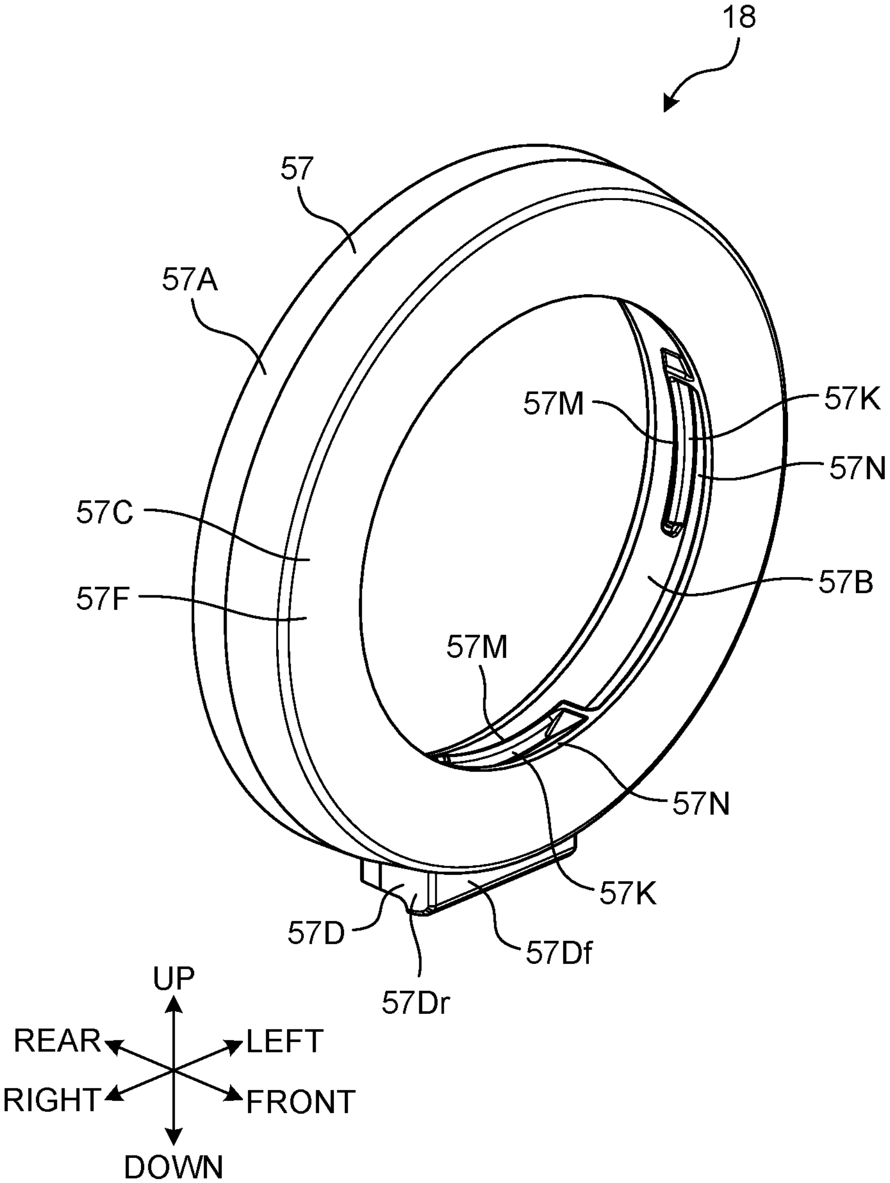
FIG. 6 is an oblique view, viewed from the front, which illustrates a light unit according to the first embodiment.
Figure 7:
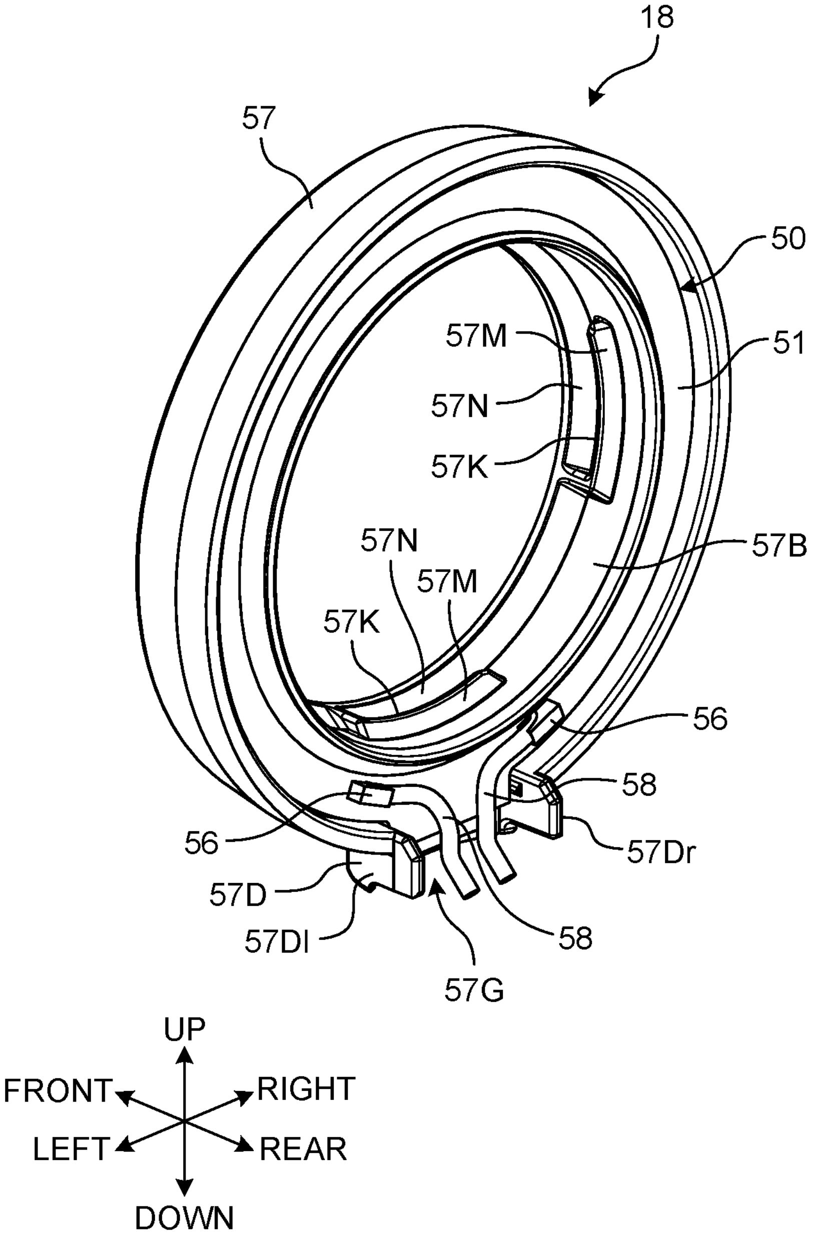
FIG. 7 is an oblique view, viewed from the rear, which illustrates the light unit according to the first embodiment.
Figure 8:
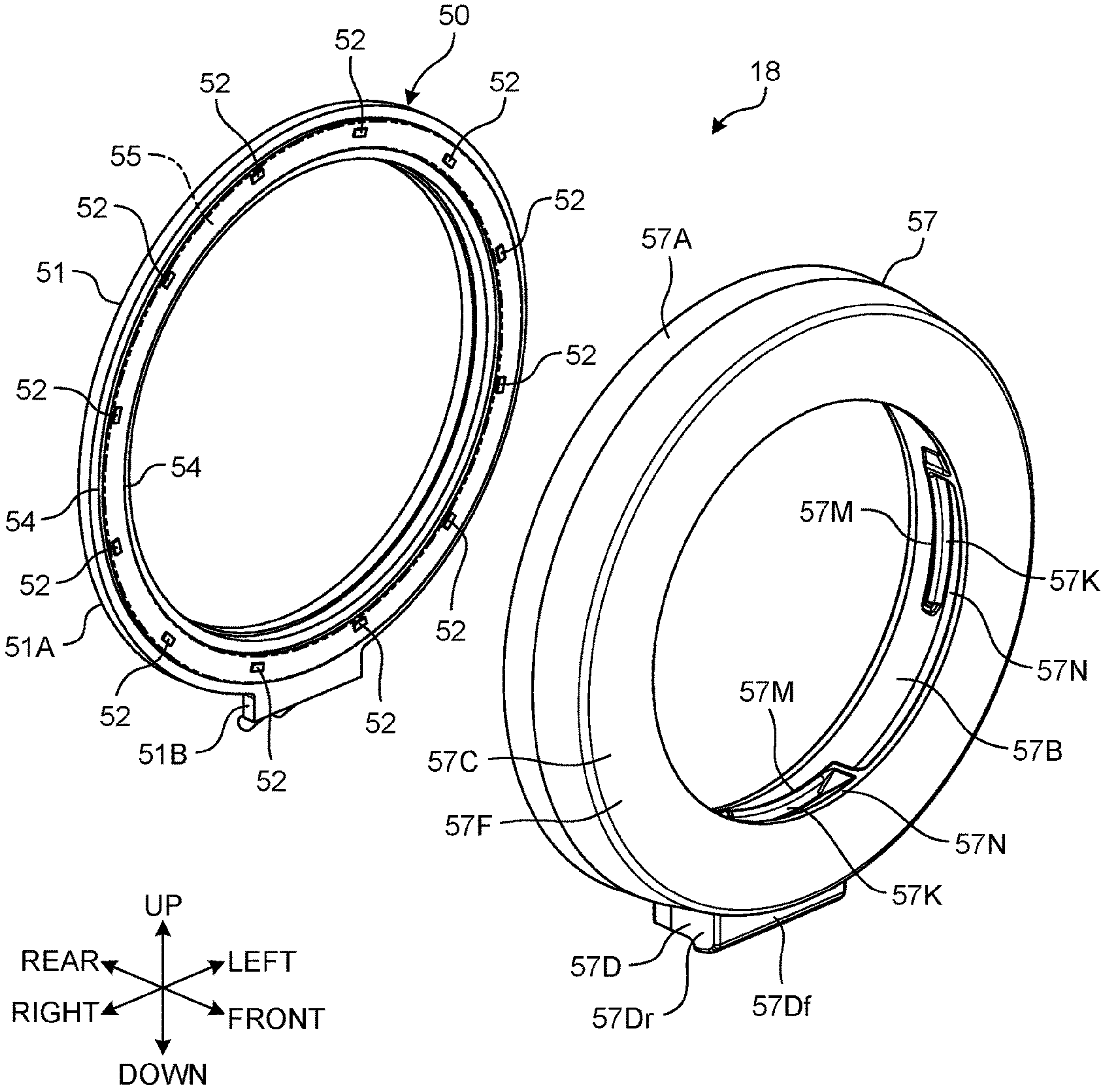
FIG. 8 is an exploded oblique view, viewed from the front, which illustrates the light unit according to the first embodiment.
Figure 9:
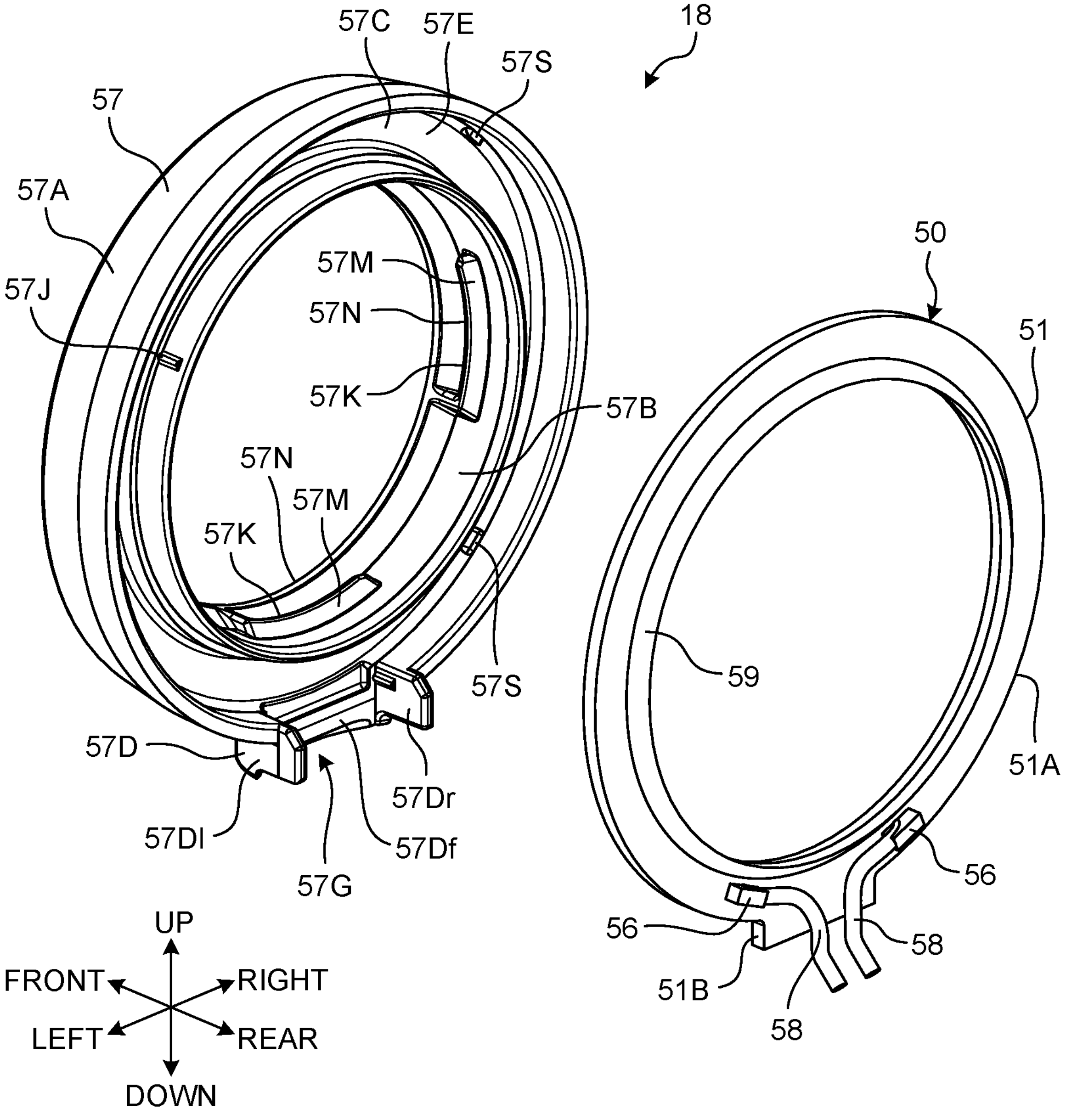
FIG. 9 is an exploded oblique view, viewed from the rear, which illustrates the light unit according to the first embodiment.

FIG. 6 is an oblique view, viewed from the front, which illustrates the light unit 18 according to the present embodiment. FIG. 7 is an oblique view, viewed from the rear, which illustrates the light unit 18 according to the present embodiment. FIG. 8 is an exploded oblique view, viewed from the front, which illustrates the light unit 18 according to the present embodiment. FIG. 9 is an exploded oblique view, viewed from the rear, which illustrates the light unit 18 according to the present embodiment.

As illustrated in FIGS. 6, 7, 8, and 9, the light unit 18 includes the chip-on-board light emitting diode 50 and a light cover 57. The chip-on-board light emitting diode 50 includes the substrate 51, the LED chips 52, the bank 54, the phosphor 55, and the pair of electrodes 56.

The substrate 51 has an annular shape. The substrate 51 includes a circular ring portion 51A and a support portion 51B protruding downward from a lower portion of the circular ring portion 51A.

The LED chips 52 are arranged on a front surface of the circular ring portion 51A of the substrate 51. The LED chips 52 are arranged at intervals in a circumferential direction of the circular ring portion 51A. In the present embodiment, 12 LED chips 52 are arranged at equal intervals in the circumferential direction of the circular ring portion 51A.

The bank 54 is provided on the front surface of the circular ring portion 51A of the substrate 51. The bank 54 protrudes forward from the front surface of the circular ring portion 51A. The bank 54 defines a compartment space in which the phosphor 55 is disposed. The bank 54 has a circular ring shape. In the present embodiment, the bank 54 is provided in a double circular ring shape. That is, in the present embodiment, the bank 54 includes a circular ring shaped first bank 54 provided on the front surface of the circular ring portion 51A and a circular ring shaped second bank 54 provided radially outside with respect to the first bank 54 on the front surface of the circular ring portion 51A. The first bank 54 is disposed radially inside with respect to the LED chips 52. The second bank 54 is disposed radially outside with respect to the LED chips 52. The LED chips 52 are disposed between the first bank 54 and the second bank 54.

The phosphor 55 is disposed on the front surface of the circular ring portion 51A of the substrate 51. The phosphor 55 has a circular ring shape. The phosphor 55 is disposed so as to cover the LED chips 52 between the first bank 54 and the second bank 54.

In the present embodiment, the electrodes 56 are disposed on the rear surface of the substrate 51. In the present embodiment, the electrodes 56 are disposed on the rear surface of the circular ring portion 51A. The electrodes 56 are connected to the controller 17 via a lead wires 58. Each of the lead wires 58 is connected to a corresponding one of the electrodes 56. A pair of the lead wires 58 is supported on a rear surface of the support portion 51B. The electrodes 56 may be disposed on a front surface of the support portion 51B, for example. The lead wires 58 may be supported on the front surface of the support portion 51B.

A current output from the battery pack 25 is supplied to the electrodes 56 via the controller 17 and the lead wires 58. The current supplied to the electrodes 56 is supplied to the LED chips 52 via the substrate 51 and the gold wires 53 (not illustrated in FIGS. 6 to 9). The LED chips 52 emit light based on the current supplied from the battery pack 25.

Figure 10:
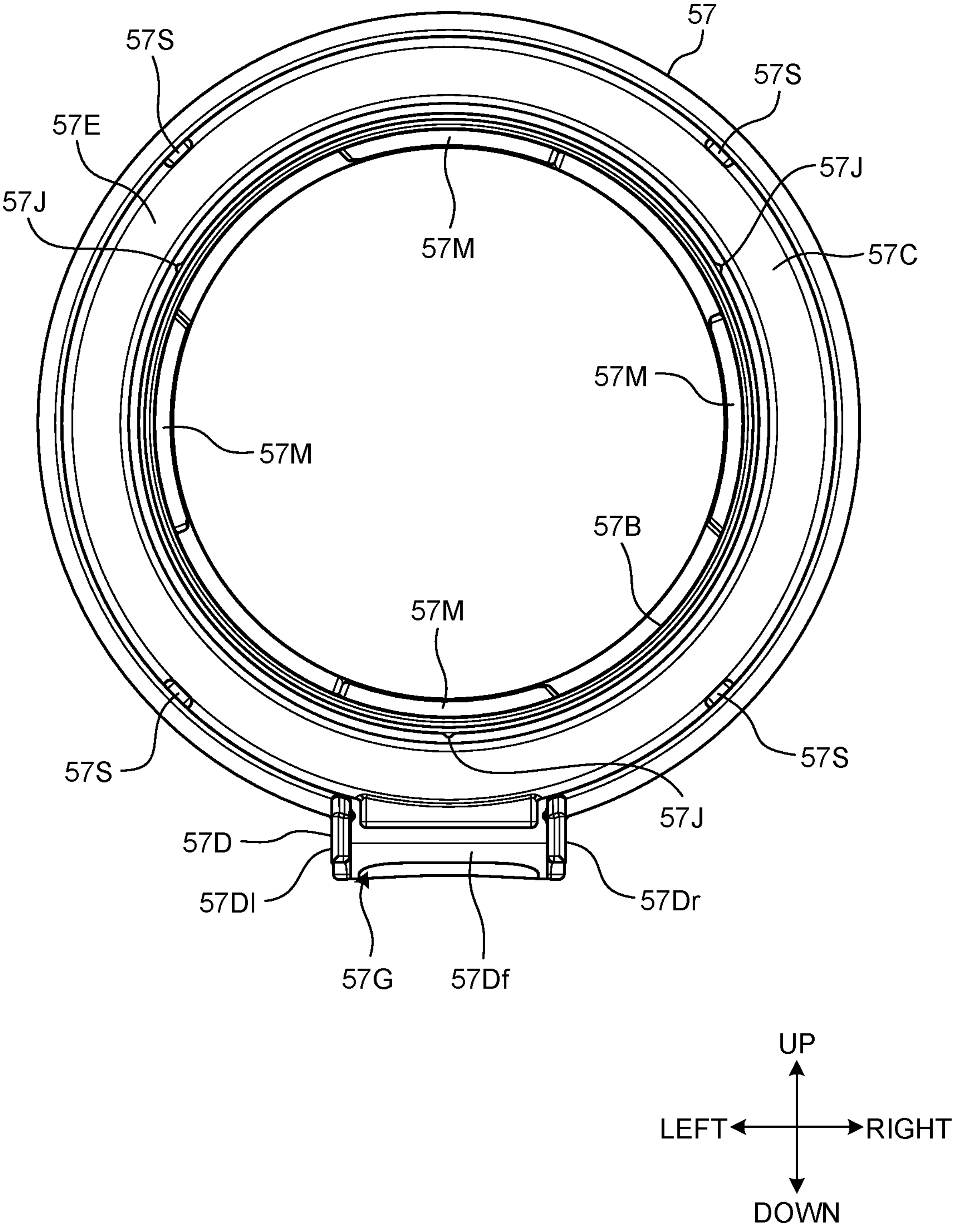
FIG. 10 is a rear view of a light cover according to the first embodiment.

FIG. 10 is a rear view of the light cover 57 according to the present embodiment. The light cover 57 is connected to the chip-on-board light emitting diode 50. The light cover 57 is fixed to the substrate 51. The light cover 57 is made of polycarbonate resin. At least a part of the light cover 57 is disposed in front of the chip-on-board light emitting diode 50. The light cover 57 includes an outer cylindrical portion 57A, an inner cylindrical portion 57B, a light transmission portion 57C, and a protrusion 57D.

The outer cylindrical portion 57A is disposed radially outside with respect to the inner cylindrical portion 57B. In the radial direction, at least a part of the chip-on-board light emitting diode 50 is disposed between the outer cylindrical portion 57A and the inner cylindrical portion 57B. The outer cylindrical portion 57A is disposed radially outside with respect to the circular ring portion 51A of the substrate 51. The inner cylindrical portion 57B is disposed radially inside with respect to the circular ring portion 51A of the substrate 51. An opening 57G is provided in a lower portion of the outer cylindrical portion 57A.

The light transmission portion 57C has a circular ring shape. The light transmission portion 57C is disposed so as to connect a front end portion of the outer cylindrical portion 57A and a front end portion of the inner cylindrical portion 57B. The light transmission portion 57C faces the front surface of the circular ring portion 51A. The light transmission portion 57C faces the LED chips 52. The light emitted from the LED chips 52 passes through the light transmission portion 57C and is emitted forward from the light unit 18.

The light transmission portion 57C has a light entrance surface 57E into which the light from the LED chips 52 is incident, and a light exit surface 57F from which the light transmitted through the light transmission portion 57C is output. The front surface of the circular ring portion 51A faces the light entrance surface 57E of the light transmission portion 57C. The light entrance surface 57E faces the LED chips 52. The light entrance surface 57E faces substantially rearward. The light exit surface 57F faces substantially forward.

The protrusion 57D is provided so as to protrude downward from the lower portion of the outer cylindrical portion 57A. The protrusion 57D faces at least a part of the support portion 51B of the substrate 51. In the present embodiment, the opening 57G is provided at a lower end portion of the protrusion 57D.

The protrusion 57D includes a front protrusion 57Df facing a front surface of the support portion 51B, a left protrusion 57Dl facing a left surface of the support portion 51B, and a right protrusion 57Dr facing a right surface of the support portion 51B. Each of the front protrusion 57Df, the left protrusion 57Dl, and the support portion 51B has a plate shape. A front end portion of the left protrusion 57Dl is connected to a left end portion of the front protrusion 57Df. A front end portion of the right protrusion 57Dr is connected to a right end portion of the front protrusion 57Df. The opening 57G is defined by a lower end portion of the front protrusion 57Df, a lower end portion of the left protrusion 57Dl, and a lower end portion of the right protrusion 57Dr.

Each of an upper end portion of a right surface of the left protrusion 57Dl and an upper end portion of a left surface of the right protrusion 57Dr is connected to the inner circumferential surface of the outer cylindrical portion 57A.

Figure 11:
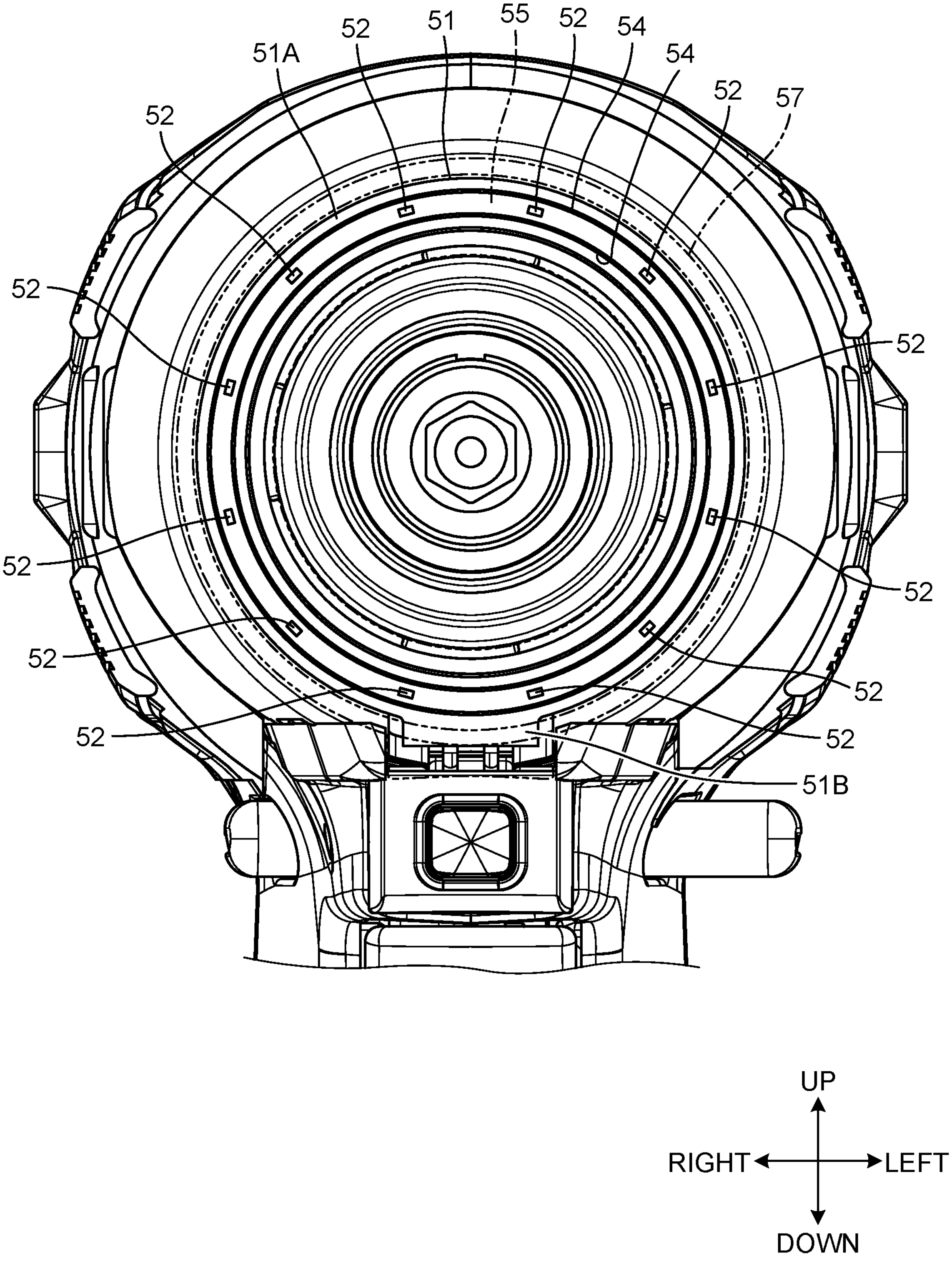
FIG. 11 is a front view of the upper portion of the power tool according to the first embodiment.
Figure 12:
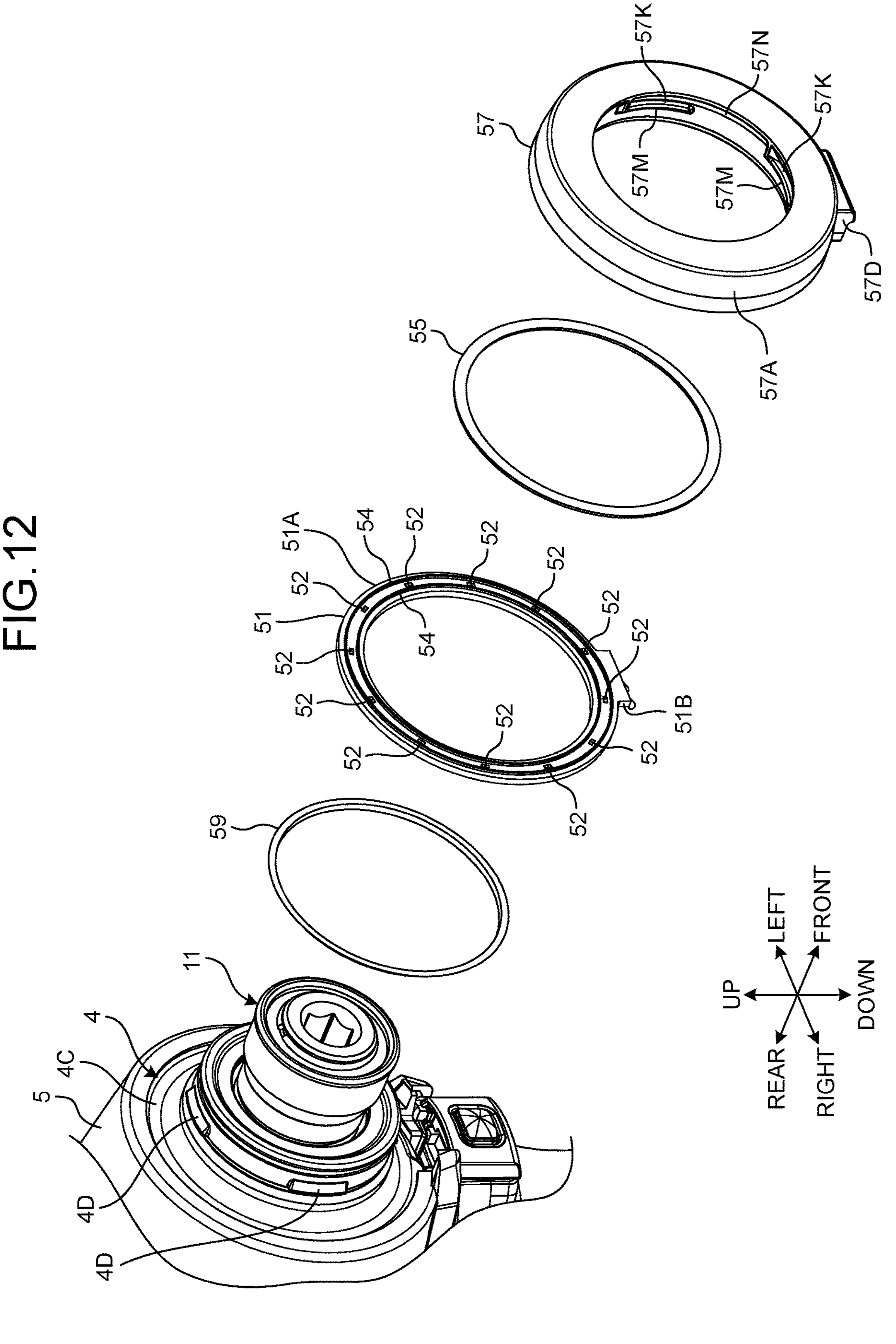
FIG. 12 is an exploded oblique view, viewed from the front, which illustrates the upper portion of the power tool according to the first embodiment.
Figure 13:
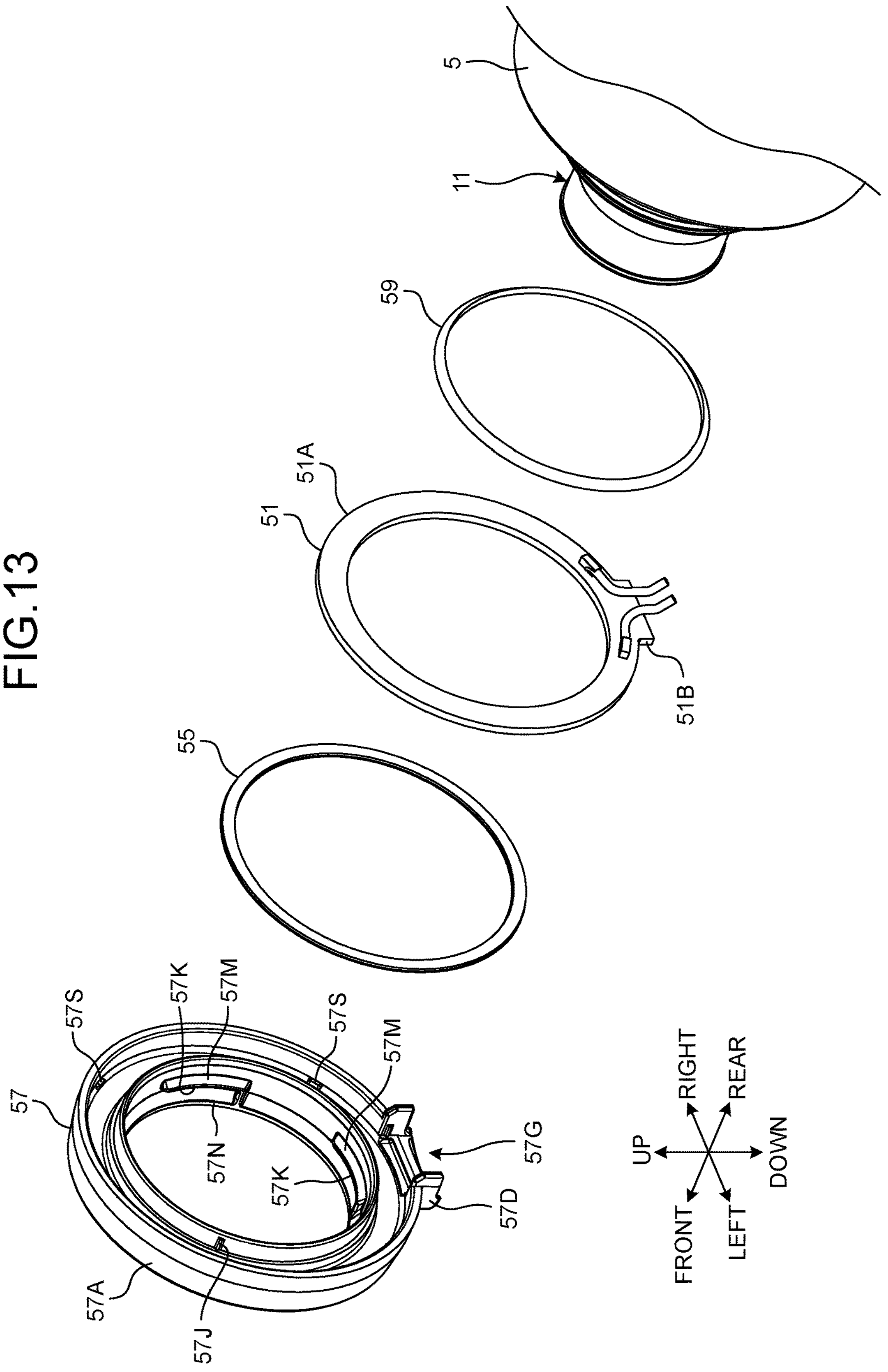
FIG. 13 is an exploded oblique view, viewed from the rear, which illustrates the upper portion of the power tool according to the first embodiment.
Figure 14:
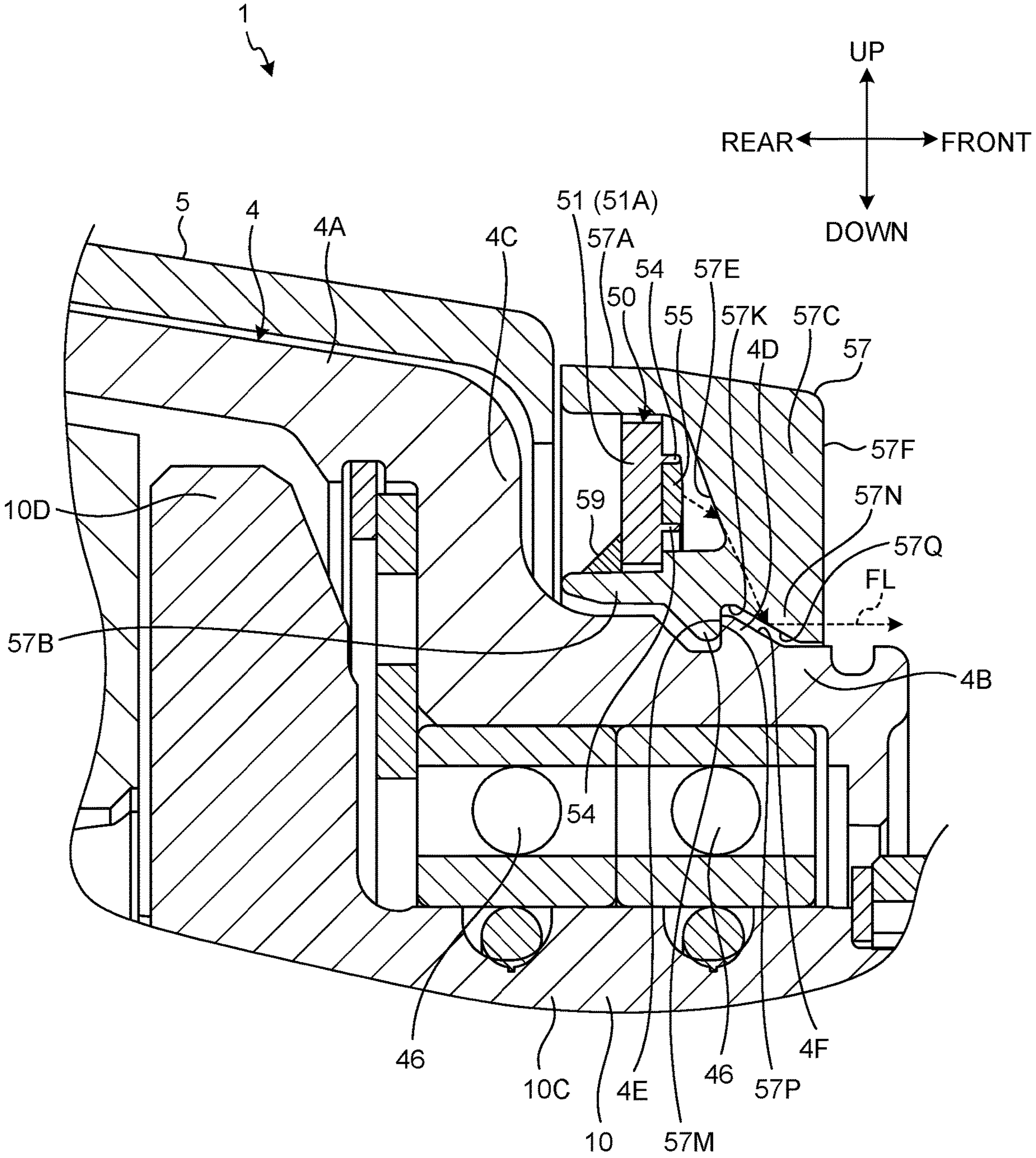
FIG. 14 is a cross-sectional view illustrating an upper portion of the light unit according to the first embodiment.
Figure 15:
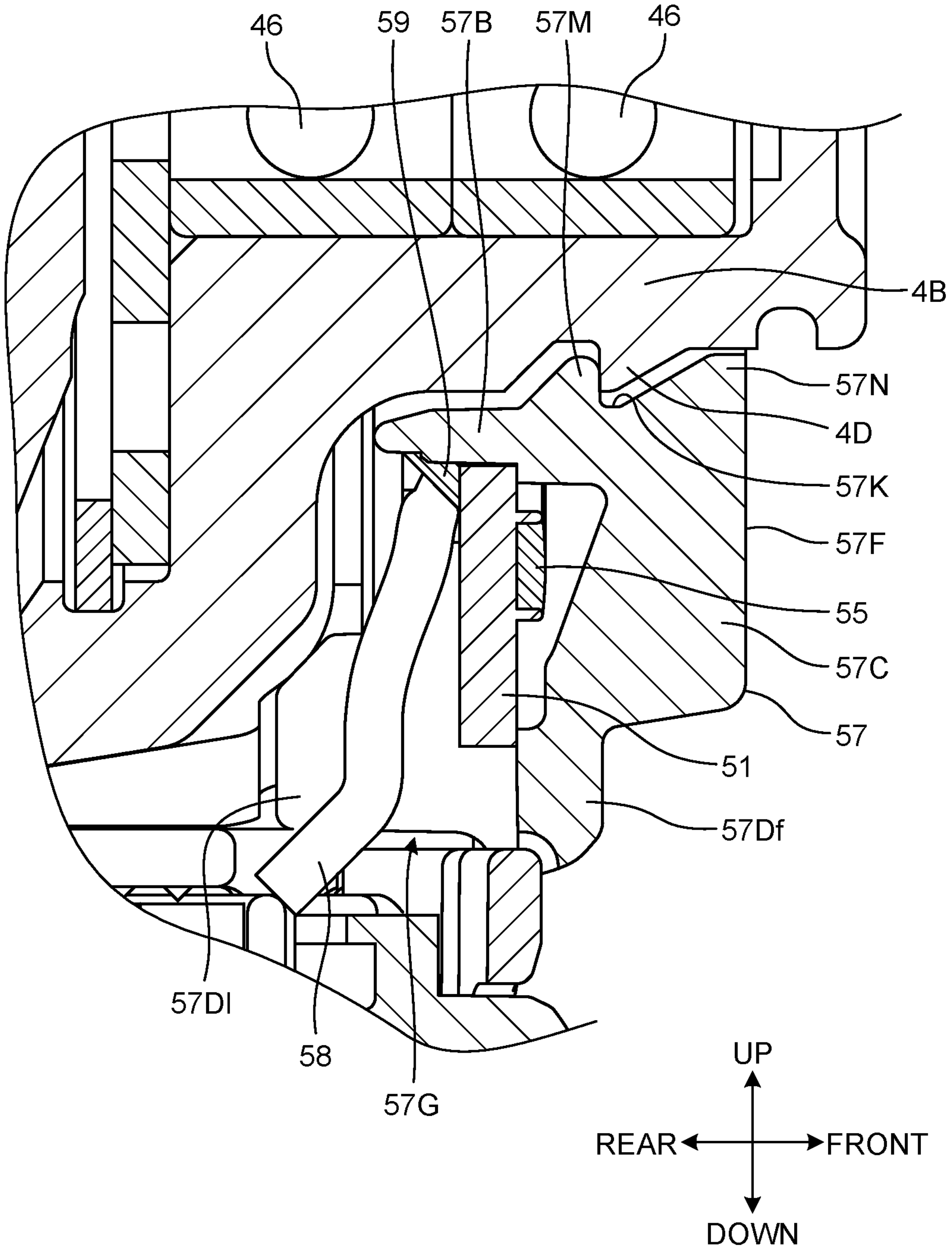
FIG. 15 is a cross-sectional view illustrating a lower part of the light unit according to the first embodiment.

FIG. 11 is a front view of the upper portion of the power tool 1 according to the present embodiment. FIG. 12 is an exploded oblique view, viewed from the front, which illustrates the upper portion of the power tool 1 according to the present embodiment. FIG. 13 is an exploded oblique view, viewed from the rear, which illustrates the upper portion of the power tool 1 according to the present embodiment. FIG. 14 is a cross-sectional view illustrating an upper portion of the light unit 18 according to the present embodiment. FIG. 15 is a cross-sectional view illustrating a lower portion of the light unit 18 according to the present embodiment.

The light unit 18 including the chip-on-board light emitting diode 50 is disposed around the anvil shaft portion 10C of the anvil 10. The light unit 18 including the chip-on-board light emitting diode 50 is disposed around the front cylindrical portion 4B of the hammer case 4. The inner cylindrical portion 57B of the light cover 57 is disposed around the front cylindrical portion 4B of the hammer case 4. The inner cylindrical portion 57B of the light cover 57 is fixed to the front cylindrical portion 4B of the hammer case 4.

The substrate 51 is fixed to the light cover 57. In the radial direction, the substrate 51 is disposed between the outer cylindrical portion 57A and the inner cylindrical portion 57B.

As illustrated in FIGS. 9 and 10, support protrusions 57J are provided on the outer circumferential surface of the inner cylindrical portion 57B. The support protrusions 57J protrude radially outward from the outer circumferential surface of the inner cylindrical portion 57B. The support protrusions 57J are provided at intervals in the circumferential direction. As illustrated in FIG. 10, in the present embodiment, three support protrusions 57J are provided at intervals in the circumferential direction. An inner circumferential surface of the circular ring portion 51A of the substrate 51 is supported by the support protrusions 57J. A part of the inner circumferential surface of the circular ring portion 51A is in contact with the support protrusions 57J. The support protrusions 57J form a gap between the inner circumferential surface of the circular ring portion 51A and the outer circumferential surface of the inner cylindrical portion 57B. The substrate 51 is fixed to the inner cylindrical portion 57B via an adhesive 59 (FIG. 7). In the present embodiment, the rear surface of the substrate 51 and the outer circumferential surface of the inner cylindrical portion 57B are fixed by the adhesive 59.

As illustrated in FIGS. 9 and 10, projections 57S are provided on the light entrance surface 57E of the light transmission portion 57C. The projections 57S protrude rearward from the light entrance surface 57E of the light transmission portion 57C. The projections 57S are disposed in an outer edge region of the light entrance surface 57E. The projections 57S are provided at positions that are not irradiated with the light emitted from the LED chip 52. The projections 57S are provided at intervals in the circumferential direction. As illustrated in FIG. 10, in the present embodiment, four projections 57S are provided at intervals in the circumferential direction. The front surface of the circular ring portion 51A of the substrate 51 is supported by the projections 57S. A part of the front surface of the circular ring portion 51A is in contact with the projections 57S. The projections 57S form a gap between the front surface of the circular ring portion 51A and the light entrance surface 57E of the light transmission portion 57C.

Protrusions 4D are provided on the outer circumferential surface of the front cylindrical portion 4B. The protrusions 4D protrude radially outward from the outer circumferential surface of the front cylindrical portion 4B. The protrusions 4D are provided at intervals in the circumferential direction. In the present embodiment, four protrusions 4D are provided at intervals in the circumferential direction. Each of the protrusions 4D has a rear surface 4E facing rearward and a slope 4F inclined radially inward toward the front.

The light cover 57 is fixed to the front cylindrical portion 4B of the hammer case 4. On an inner circumferential surface of the inner cylindrical portion 57B of the light cover 57, rear slide portions 57M and front slide portions 57N are provided. The rear slide portions 57M and the front slide portions 57N each protrude radially inward from the inner circumferential surface of the inner cylindrical portion 57B. The front slide portions 57N are disposed forward of the rear slide portions 57M. As illustrated in FIG. 10, four rear slide portions 57M are provided at intervals in the circumferential direction. The four front slide portions 57N are respectively disposed forward of the four rear slide portions 57M. Recesses 57K are provided between the rear slide portions 57M and the front slide portions 57N. The recesses 57K are provided in the inner cylindrical portion 57B. The protrusions 4D are disposed in the recesses 57K. The rear slide portions 57M each have a front surface 57P, which is in contact with the rear surface 4E of each of the protrusions 4D. The front slide portions 57N each have a slope 57Q, which faces the slope 4F of each of the protrusions 4D.

An insertion port is provided between one end of each of the rear slide portions 57M in the circumferential direction and the corresponding one of the front slide portions 57N. The protrusions 4D are disposed in the recesses 57K via the insertion ports. After the protrusions 4D are inserted into the insertion ports, the light unit 18 is rotated, whereby the protrusions 4D are inserted into the recesses 57K. As a result, the light cover 57 and the front cylindrical portion 4B of the hammer case 4 are fixed. The light unit 18 and the hammer case 4 are fixed by fixing the light cover 57 and the front cylindrical portion 4B of the hammer case 4.

The light emitted from the LED chips 52 is incident on the light entrance surface 57E via the phosphor 55. As illustrated in FIG. 14, the light entrance surface 57E is inclined forward toward the radial inside. The light incident on the light entrance surface 57E passes through the light transmission portion 57C and then is output through the light exit surface 57F.

As indicated by an arrow FL in FIG. 14, at least a part of the light incident on the light entrance surface 57E reaches the slope 57Q. Each of the slopes 57Q is inclined forward toward the radial inside. The light that has reached each of the slopes 57Q is totally reflected by the slope 57Q and travels forward. The light totally reflected by the slopes 57Q is output through the light exit surface 57F.

When the trigger lever 14 is operated, the motor 6 is activated (energized), and light is emitted from the LED chips 52 of the chip-on-board light emitting diode 50. The chip-on-board light emitting diode 5 emits (outputs) a higher amount of light, thereby brightly illuminating the work target or work space.

In a case where the impact tool 1 is used outdoors in rainy weather, for example, the chip-on-board light emitting diode 50 may be wet with rainwater and affected by rainwater (liquid). There is a possibility that rainwater enters the inside of the outer cylindrical portion 57A through a gap between the front end portion of the case cover 5 and the rear end portion of the outer cylindrical portion 57A, for example, and wets at least a part of the chip-on-board light emitting diode 50. When at least a part of the chip-on-board light emitting diode 50 is left wet with rainwater, there is a possibility that the chip-on-board light emitting diode 50 malfunctions or fails. As a cause of malfunction or failure of the chip-on-board light emitting diode 50, a short circuit of the LED chip 52 due to rainwater is exemplified.

In the present embodiment, the opening 57G is provided in the lower portion of the outer cylindrical portion 57A. The opening 57G functions as a drain hole. The rainwater having entered the inside of the outer cylindrical portion 57A flows toward the opening 57G owing to the action of gravity and is discharged from the opening 57G. This prevents the chip-on-board light emitting diode 50 from being left wet with rainwater.

In the present embodiment, a drive voltage of the light unit 18 is 5 V. The light flux of the light unit 18 is 80 lumens or more and 200 lumens or less. The light flux of the light unit 18 may be 100 lumens or more and 150 lumens or less, or may be 120 lumens or more and 140 lumens or less.

Effects

As described above, in the present embodiment, the impact tool 1 may include: the motor 6; the anvil 10 that is rotated by the rotational force of the motor 6; the chip-on-board light emitting diode 50 that is disposed around the anvil 10 and includes the substrate 51 including the circular ring portion 51A and the LED chip 52 disposed on the front surface of the circular ring portion 51A; and the light cover 57 that is fixed to the substrate 51 and includes the outer cylindrical portion 57A disposed radially outside with respect to the circular ring portion 51A and the light transmission portion 57C through which light emitted from the LED chip 52 passes. The opening 57G may be provided in the lower portion of the outer cylindrical portion 57A.

According to the above configuration, in a case where liquid such as rainwater enters the inside of the outer cylindrical portion 57A of the light cover 57, the liquid is discharged from the opening 57G provided in the lower portion of the outer cylindrical portion 57A. Therefore, the chip-on-board light emitting diode 50 is prevented from being left wet with the liquid, and the chip-on-board light emitting diode 50 is prevented from being affected by the liquid or the like. Therefore, occurrence of malfunction or failure of the chip-on-board light emitting diode 50 is suppressed.

In the present embodiment, the substrate 51 may include the support portion 51B protruding downward from the lower portion of the circular ring portion 51A. The light cover 57 may include the protrusion 57D that protrudes downward from the lower portion of the outer cylindrical portion 57A and faces at least a part of the support portion 51B. The opening 57G may be provided in the protrusion 57D.

According to the above configuration, the liquid that has entered the inside of the outer cylindrical portion 57A is discharged from the opening 57G provided in the protrusion 57D.

In the present embodiment, the protrusion 57D may include: a front protrusion 57Df facing the front surface of the support portion 51B; a left protrusion 57Dl facing the left surface of the support portion 51B; and a right protrusion 57Dr facing the right surface of the support portion 51B. The opening 57G may be defined by the front protrusion 57Df, the left protrusion 57Dl, and the right protrusion 57Dr.

According to the above configuration, the liquid that has entered the inside of the outer cylindrical portion 57A flows through at least a part of the rear surface of the front protrusion 57Df, the right surface of the left protrusion 57Dl, and the left surface of the right protrusion 57Dr, and is discharged from the opening 57G.

In the present embodiment, each of the right surface of the left protrusion 57Dl and the left surface of the right protrusion 57Dr may be connected to the inner circumferential surface of the outer cylindrical portion 57A.

According to the above configuration, the liquid that has entered the inside of the outer cylindrical portion 57A flows through the inner circumferential surface of the outer cylindrical portion 57A, then flows through at least a part of the right surface of the left protrusion 57Dl and the left surface of the right protrusion 57Dr, and is discharged from the opening 57G.

In the present embodiment, the front surface of the circular ring portion 51A may face the light entrance surface 57E of the light transmission portion 57C. The light cover 57 may include the projection 57S protruding rearward from the light entrance surface 57E. A part of the front surface of the circular ring portion 51A may be in contact with the projection 57S.

According to the above configuration, a part of the front surface of the circular ring portion 51A comes into contact with the projection 57S, whereby the front surface of the circular ring portion 51A and the light entrance surface 57E of the light transmission portion 57C face each other with a gap interposed therebetween. Since the front surface of the circular ring portion 51A and the light entrance surface 57E of the light transmission portion 57C are not in contact with each other, the liquid that has entered between the front surface of the circular ring portion 51A and the light entrance surface 57E of the light transmission portion 57C can flow toward the opening 57G without staying between the front surface of the circular ring portion 51A and the light entrance surface 57E of the light transmission portion 57C.

In the present embodiment, the light cover 57 may include the inner cylindrical portion 57B disposed radially inside with respect to the circular ring portion 51A. The light transmission portion 57C may be disposed so as to connect the front end portion of the outer cylindrical portion 57A and the front end portion of the inner cylindrical portion 57B.

According to the above configuration, since the outer cylindrical portion 57A of the light cover 57 is disposed radially outside with respect to the circular ring portion 51A and the inner cylindrical portion 57B of the light cover 57 is disposed radially inside with respect to the circular ring portion 51A, the connection between the substrate 51 and the light cover 57 is stabilized.

In the present embodiment, the light cover 57 may include a support protrusion 57J protruding radially outward from the outer circumferential surface of the inner cylindrical portion 57B. A part of the inner circumferential surface of the circular ring portion 51A may be in contact with the support protrusion 57J.

According to the above configuration, a part of the inner circumferential surface of the circular ring portion 51A comes into contact with the support protrusion 57J, whereby the inner circumferential surface of the circular ring portion 51A and the outer circumferential surface of the inner cylindrical portion 57B face each other with a gap interposed therebetween. Since the inner circumferential surface of the circular ring portion 51A and the outer circumferential surface of the inner cylindrical portion 57B are not in contact with each other, the liquid that has entered between the inner circumferential surface of the circular ring portion 51A and the outer circumferential surface of the inner cylindrical portion 57B can flow toward the opening 57G without staying between the inner circumferential surface of the circular ring portion 51A and the outer circumferential surface of the inner cylindrical portion 57B.

In the present embodiment, the impact tool 1 may include the speed reduction mechanism 7 configured to transmit the rotational force of the motor 6 to the anvil 10, and the hammer case 4 that accommodates therein the speed reduction mechanism 7. The hammer case 4 may include the rear cylindrical portion 4A that accommodates therein the speed reduction mechanism 7, the front cylindrical portion 4B that holds the anvil bearing 46 that supports the anvil 10, and an annular portion 4C that connects a front end portion of the rear cylindrical portion 4A and a rear end portion of the front cylindrical portion 4B. The chip-on-board light emitting diode 50 may be disposed around the front cylindrical portion 4B. The inner cylindrical portion 57B may be disposed around the front cylindrical portion 4B and fixed to the front cylindrical portion 4B.

According to the above configuration, the chip-on-board light emitting diode 50 is fixed to the front cylindrical portion 4B of the hammer case 4 via the light cover 57.

In the present embodiment, the front cylindrical portion 4B may include the protrusion 4D that is a protrusion protruding radially outward from the outer circumferential surface of the front cylindrical portion 4B. The inner cylindrical portion 57B may include the recess 57K in which the protrusion 4D is disposed.

According to the above configuration, the chip-on-board light emitting diode 50 is fixed to the front cylindrical portion 4B of the hammer case 4 via the light cover 57.

Second Embodiment

A second embodiment will be described. In the following description, the same or equivalent components as those of the above-described embodiment are denoted by the same reference signs, and the description of the components is simplified or omitted.

Light Unit

Figure 16:
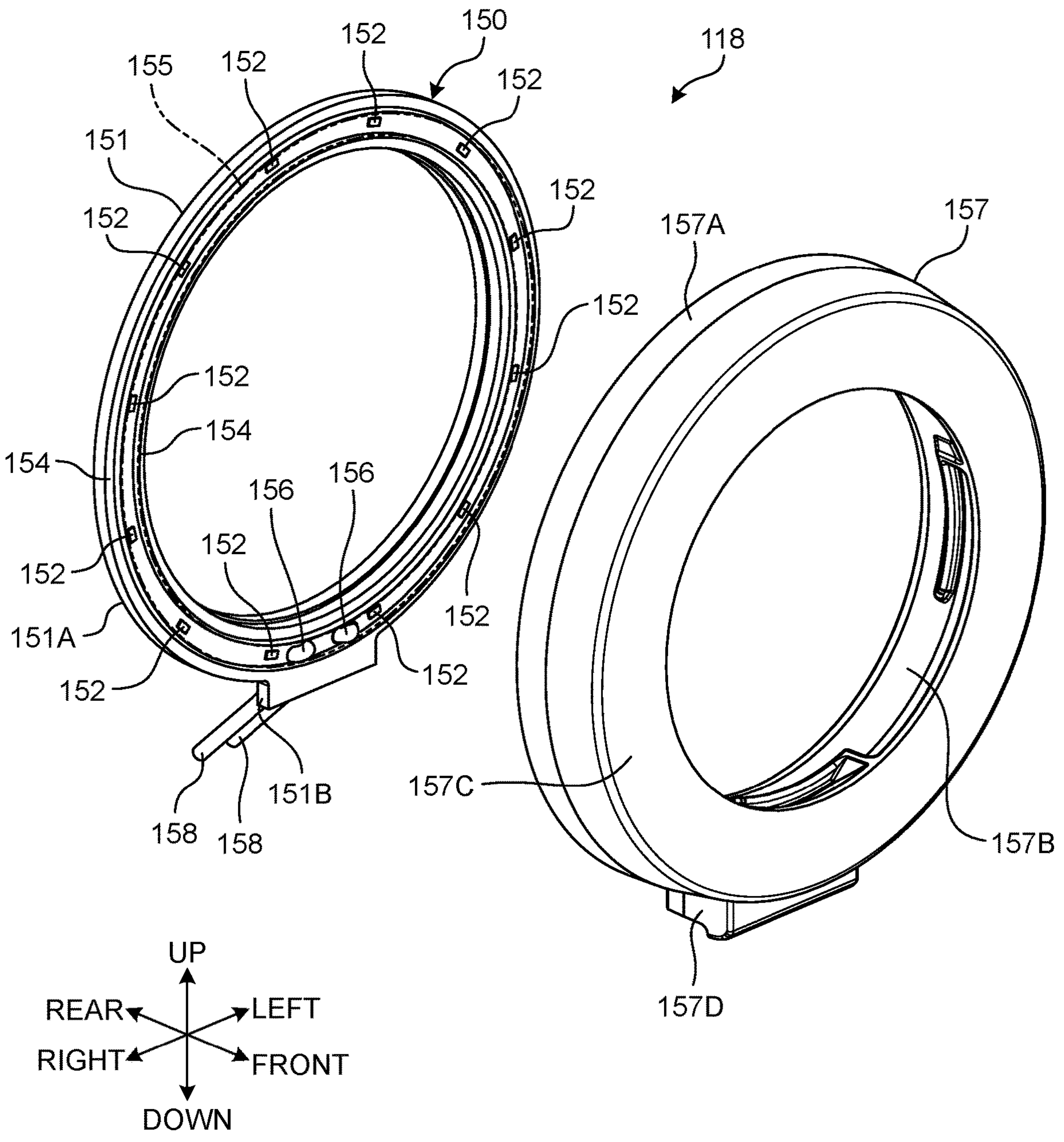
FIG. 16 is an exploded oblique view, viewed from the front, which illustrates a light unit according to a second embodiment.
Figure 17:
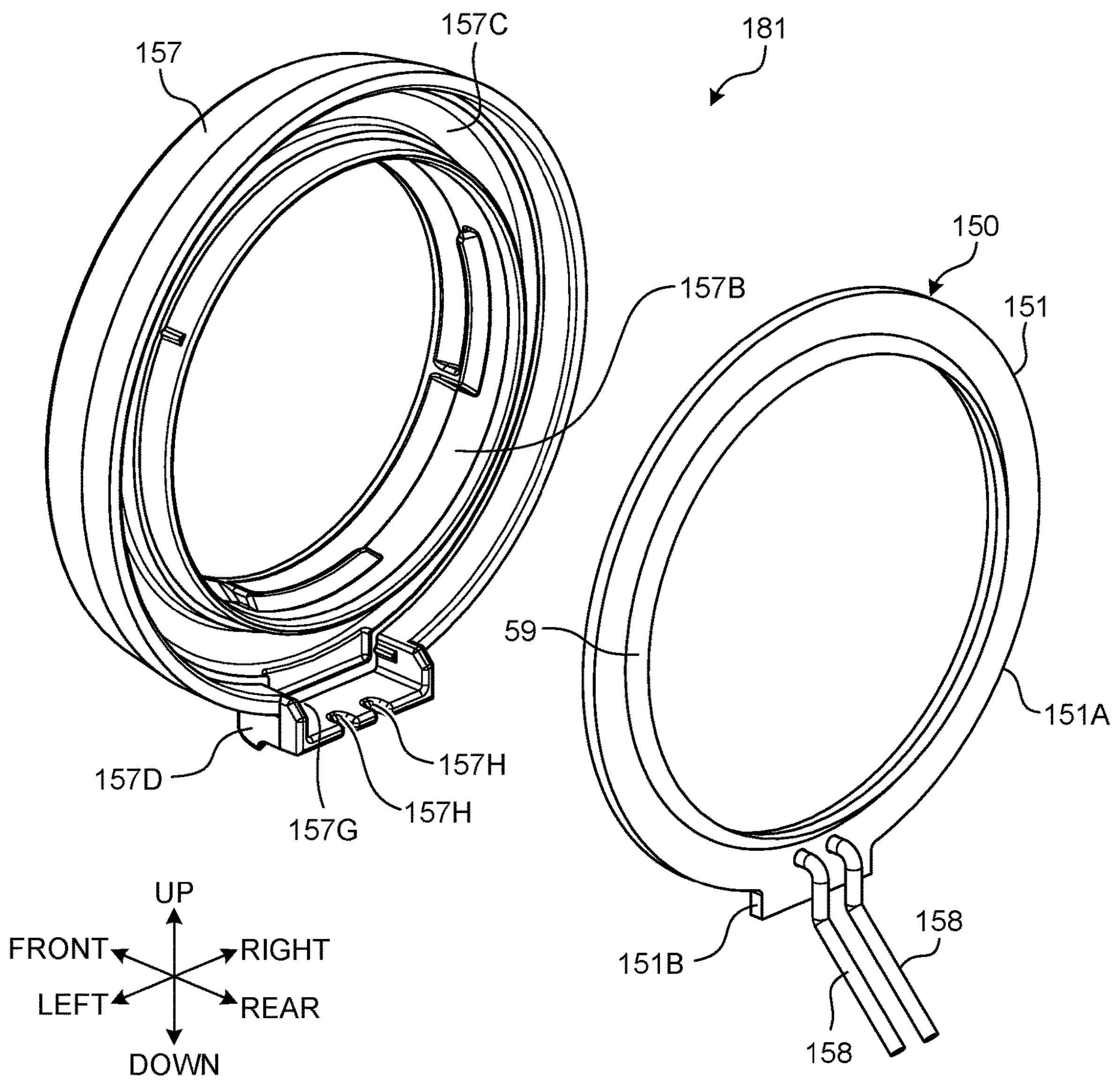
FIG. 17 is an exploded oblique view, viewed from the rear, which illustrates the light unit according to the second embodiment.

FIG. 16 is an exploded oblique view, viewed from the front, which illustrates a light unit 118 according to the present embodiment. FIG. 17 is an exploded oblique view, viewed from the rear, which illustrates the light unit 118 according to the present embodiment.

As illustrated in FIGS. 16 and 17, the light unit 118 includes a chip-on-board light emitting diode 150 and a light cover 157. The chip-on-board light emitting diode 150 includes a substrate 151, a plurality of LED chips 152, a bank 154, a phosphor 155, and a pair of electrodes 156.

The substrate 151 has an annular shape. The substrate 151 includes a circular ring portion 151A and a support portion 151B protruding downward from a lower portion of the circular ring portion 151A.

The LED chips 152 are arranged on a front surface of the circular ring portion 151A of the substrate 151. The LED chips 152 is arranged at intervals in the circumferential direction of the circular ring portion 151A. In the present embodiment, 12 LED chips 152 are arranged at equal intervals in the circumferential direction of the circular ring portion 151A.

The bank 154 is provided on the front surface of the circular ring portion 151A of the substrate 151. The bank 154 protrudes forward from the front surface of the circular ring portion 151A. The bank 154 defines a compartment space in which the phosphor 155 is disposed. The bank 154 has a circular ring shape. In the present embodiment, the bank 154 is provided in a double circular ring shape. That is, in the present embodiment, the bank 154 includes a circular ring shaped first bank 154 provided on the front surface of the circular ring portion 51A and a circular ring shaped second bank 154 provided radially outside with respect to the first bank 154 on the front surface of the circular ring portion 151A.

The phosphor 155 is disposed on the front surface of the circular ring portion 151A of the substrate 151. The phosphor 155 has a circular ring shape. The phosphor 155 is disposed between the first bank 154 and the second bank 154.

The electrodes 156 are disposed on the front surface of the circular ring portion 151A of the substrate 151. The electrodes 156 are disposed at a lower portion of the front surface of the circular ring portion 151A.

The LED chips 152 and the pair of electrodes 156 are disposed on the inner side of the bank 154. That is, the plurality of LED chips 152 and the pair of electrodes 156 are each disposed between the first bank 154 and the second bank 154 in the radial direction. The first bank 154 is disposed radially inside with respect to the LED chip 152 and the electrode 156. The second bank 154 is disposed radially outside with respect to the LED chip 152 and the electrode 156. The phosphor 155 is disposed so as to cover the plurality of LED chips 152 and the pair of electrodes 156 between the first bank 154 and the second bank 154.

The electrodes 156 are connected to a battery pack 25 via the lead wires 158 and a controller 17. Each of lead wires 158 is connected to a corresponding one of the electrodes 156. The pair of lead wires 158 protrude rearward from the rear surface of the circular ring portion 151A. Each of the lead wires 158 is connected to the corresponding one electrode 156 from the rear surface of the circular ring portion 151A through a through hole provided in the circular ring portion 151A so as to penetrate the front surface and the rear surface of the circular ring portion 151A. At least a part of the lead wire 158 is supported on the rear surface of the support portion 151B.

A current output from the battery pack 25 is supplied to the electrodes 156 via the controller 17 and the lead wires 158. The current supplied to the electrodes 156 is supplied to the LED chips 152 via the substrate 151 and gold wires (not illustrated in FIGS. 16 and 17). The LED chips 152 emit light based on the current supplied from the battery pack 25.

The light cover 157 is connected to the chip-on-board light emitting diode 150. The light cover 157 is fixed to the substrate 151. The light cover 157 is made of polycarbonate resin. At least a part of the light cover 157 is disposed in front of the chip-on-board light emitting diode 150. The light cover 157 includes an outer cylindrical portion 157A, an inner cylindrical portion 157B, a light transmission portion 157C, and a protrusion 157D.

The outer cylindrical portion 157A is disposed radially outside with respect to the inner cylindrical portion 157B. In the radial direction, at least a part of the chip-on-board light emitting diode 150 is disposed between the outer cylindrical portion 157A and the inner cylindrical portion 157B. The outer cylindrical portion 157A is disposed radially outside with respect to the circular ring portion 151A of the substrate 151. The inner cylindrical portion 157B is disposed radially inside with respect to the circular ring portion 151A of the substrate 151.

The light transmission portion 157C has a circular ring shape. The light transmission portion 157C is disposed so as to connect a front end portion of the outer cylindrical portion 157A and a front end portion of the inner cylindrical portion 157B. The light transmission portion 157C faces the front surface of the circular ring portion 151A. The light transmission portion 157C faces the LED chips 152. The light emitted from the LED chips 152 passes through the light transmission portion 157C and is emitted forward from the light unit 118.

The protrusion 157D is provided so as to protrude downward from the lower portion of the outer cylindrical portion 157A. The housing portion 157G is formed in the protrusion 157D. The support portion 151B of the substrate 151 is disposed in the housing portion 157G. Two notches 157H are formed in the protrusion 157D. The lead wires 158 are respectively disposed in the notches 157H.

Similar to the above-described embodiment, the light unit 118 including the chip-on-board light emitting diode 150 is disposed around an anvil shaft portion 10C of an anvil 10. The light unit 118 including the chip-on-board light emitting diode 150 is disposed around a front cylindrical portion 4B of a hammer case 4. The inner cylindrical portion 157B of the light cover 157 is disposed around the front cylindrical portion 4B of the hammer case 4. The inner cylindrical portion 157B of the light cover 157 is fixed to the front cylindrical portion 4B of the hammer case 4.

Effects

As described above, in the present embodiment, the chip-on-board light emitting diode 150 may include the phosphor 155 that covers the LED chips 152 and the electrodes 156 connected to the battery pack 25 via the lead wires 158. The phosphor 155 may cover the electrodes 156.

According to the above configuration, since the LED chips 152 and the electrodes 156 are covered with the phosphor 155, contact between each of the LED chips 152 and the electrodes 156 and the liquid is suppressed. That is, the LED chips 152 and the electrodes 156 are waterproofed by the phosphor 155. Since wetting of the chip-on-board light emitting diode 150 with liquid is suppressed, occurrence of malfunction or failure of the chip-on-board light emitting diode 150 is suppressed.

In the present embodiment, the LED chips 152 and the electrodes 156 may be disposed on the front surface of the substrate 151.

According to the above configuration, the LED chips 152 and the electrodes 156 can be waterproofed by the phosphor 155 provided on the front surface of the substrate 151 without providing the phosphor 155 on the rear surface of the substrate 151.

In the present embodiment, the chip-on-board light emitting diode 150 may have the bank 154 protruding forward from the front surface of the substrate 151 and defining the compartment space in which the phosphor 155 is disposed. Each of the LED chips 152 and the electrodes 156 may be disposed on the inner side of the bank 154.

According to the above configuration, the phosphor 155 is disposed in the compartment space, which is defined on the inner side of the bank 154. Since the LED chips 152 and the electrodes 156 are disposed on the inner side of the bank 154 and the phosphor 155 is disposed on the inner side of the bank, the LED chips 152 and the electrodes 156 are waterproofed by the phosphor 155.

In the present embodiment, the substrate 151 may have the circular ring portion 151A. The bank 154 may include: the circular ring shaped first bank 154 provided on the front surface of the circular ring portion 151A; and the circular ring shaped second bank 154 provided radially outside with respect to the first bank 154 on the front surface of the circular ring portion 151A. The LED chips 152 and the electrodes 156 may be disposed between the first bank 154 and the second bank 154. The phosphor 155 may be disposed so as to cover each of the LED chips 152 and the electrodes 156 between the first bank 154 and the second bank 154.

According to the above configuration, the phosphor 155 is disposed in the circular ring shaped compartment space defined by the first bank 154 and the second bank 154. Since the LED chips 152 and the electrodes 156 are disposed between the first bank 154 and the second bank 154, the phosphor 155 is disposed between the first bank 154 and the second bank 154, whereby the LED chips 152 and the electrodes 156 are waterproofed by the phosphor 155.

In the present embodiment, the lead wires 158 may be connected to the electrodes 156 from the rear surface of the circular ring portion 151A via the through holes provided in the circular ring portion 151A.

According to the above configuration, the lead wires 158 are not disposed on the front surface of the circular ring portion 151A, but are disposed so as to protrude rearward from the rear surface of the circular ring portion 151A. Therefore, the phosphor 155 can cover the LED chips 152 and the electrodes 156 without being blocked by the lead wires 158.

In the present embodiment, the substrate 151 may have the support portion 151B protruding downward from the lower portion of the circular ring portion 151A. At least a part of the lead wire 158 may be supported on the rear surface of the support portion 151B.

According to the above configuration, since the lead wire 158 is supported by the rear surface of the support portion 151B, unnecessary movement of the lead wire 158 is suppressed. Therefore, degradation of the lead wire 158 is suppressed.

In the present embodiment, the light cover 157 may include: the outer cylindrical portion 157A disposed radially outside with respect to the circular ring portion 151A; the inner cylindrical portion 157B disposed radially inside with respect to the circular ring portion 151A; the light transmission portion 157C that is disposed so as to connect the front end portion of the outer cylindrical portion 157A and the front end portion of the inner cylindrical portion 157B and through which light emitted from the LED chips 152 passes; and the protrusion 157D protruding downward from the lower portion of the outer cylindrical portion 157A. The protrusion 157D may have the housing portion 157G in which the support portion 151B is disposed.

According to the above configuration, since the support portion 151B of the substrate 151 is housed in the housing portion 157G of the light cover 157, the connection between the substrate 151 and the light cover 157 is stabilized.

In the present embodiment, the protrusion 157D may be provided with the notch 157H in which the lead wire 158 is disposed.

According to the above configuration, since the lead wire 158 is disposed in the notch 157H, unnecessary movement of the lead wire 158 is suppressed. Therefore, degradation of the lead wire 158 is suppressed.

In the present embodiment, the plurality of the LED chips 152 may be arranged at intervals in the circumferential direction of the circular ring portion 151A.

According to the above configuration, the chip-on-board light emitting diode 150 can brightly illuminate the work target.

Other Embodiments

In the first and second embodiments described above, the impact tool (e.g., the impact tool) is an impact driver. The impact tool (e.g., the impact tool 1) may be an impact wrench.

In the above-described embodiments, the power supply of the power tool (e.g., the impact tool 1) may not be the battery pack (e.g., the impact tool 25), and may be a commercial power supply (AC power supply).

In the above-described embodiments, the power tool (e.g., the impact tool 1) is an electric power tool using an electric motor as a power source. The power tool may be a pneumatic tool using an air motor as a power source. The power source of the power tool is not limited to the electric motor or the air motor, and may be another power source. The power source of the power tool may be, for example, a hydraulic motor or a motor driven by an engine.

According to one non-limiting aspect of the present disclosure, the chip-on-board light emitting diode is prevented from being affected by liquid or the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power tool comprising:

a motor;

an output shaft that is rotated by a rotational force of the motor;

a chip-on-board light emitting diode that is disposed around the output shaft, and includes:

a substrate including a circular ring portion; and an LED chip disposed on a front surface of the circular ring portion; and a light cover that is fixed to the substrate, and includes:

an outer cylindrical portion disposed radially outside with respect to the circular ring portion to surround an outer circumferential surface of the circular ring portion; and a light transmission portion through which light emitted from the LED chip passes, wherein an opening is provided at a lower portion of the outer cylindrical portion in a same cross section in a direction perpendicular to a rotation axis of the output shaft, and a lower portion of the outer circumferential surface of the circular ring portion is exposed to outside of the outer cylindrical portion via the opening.

2. The power tool according to claim 1, wherein the substrate includes a support portion protruding downward from a lower portion of the circular ring portion, the light cover includes a protrusion protruding downward from a lower portion of the outer cylindrical portion and facing at least a part of the support portion, and the opening is provided in the protrusion.

3. The power tool according to claim 2, wherein the protrusion includes:

a front protrusion facing a front surface of the support portion;

a left protrusion facing a left surface of the support portion; and a right protrusion facing a right surface of the support portion, and the opening is defined by the front protrusion, the left protrusion, and the right protrusion.

4. The power tool according to claim 3, wherein each of a right surface of the left protrusion and a left surface of the right protrusion is connected to an inner circumferential surface of the outer cylindrical portion.

5. The power tool according to claim 1, wherein the front surface of the circular ring portion faces a light entrance surface of the light transmission portion, the light cover includes a projection projecting rearward from the light entrance surface, and a part of the front surface of the circular ring portion is in contact with the projection.

6. The power tool according to claim 1, wherein the chip-on-board light emitting diode includes:

a phosphor that covers the LED chip; and an electrode connected to a power supply via a lead wire, and the phosphor covers the electrode.

7. A power tool comprising:

a motor;

an output shaft that is rotated by a rotational force of the motor;

a chip-on-board light emitting diode that is disposed around the output shaft, and includes:

a substrate including a circular ring portion; and an LED chip disposed on a front surface of the circular ring portion; and a light cover that is fixed to the substrate, and includes:

an outer cylindrical portion disposed radially outside with respect to the circular ring portion; and a light transmission portion through which light emitted from the LED chip passes, wherein an opening is provided in a lower portion of the outer cylindrical portion, the light cover includes an inner cylindrical portion disposed radially inside with respect to the circular ring portion, and the light transmission portion is disposed so as to connect a front end portion of the outer cylindrical portion and a front end portion of the inner cylindrical portion.

8. The power tool according to claim 7, wherein the light cover includes a support protrusion protruding radially outward from an outer circumferential surface of the inner cylindrical portion, and a part of an inner circumferential surface of the circular ring portion is in contact with the support protrusion.

9. The power tool according to claim 7, further comprising:

a speed reduction mechanism configured to transmit a rotational force of the motor to the output shaft; and a gear case that accommodates therein the speed reduction mechanism, wherein the gear case includes:

a rear cylindrical portion that accommodates therein the speed reduction mechanism;

a front cylindrical portion that holds a bearing that supports the output shaft; and an annular portion that connects a front end portion of the rear cylindrical portion and a rear end portion of the front cylindrical portion, the chip-on-board light emitting diode is disposed around the front cylindrical portion, and the inner cylindrical portion is disposed around the front cylindrical portion and is fixed to the front cylindrical portion.

10. The power tool according to claim 9, wherein the front cylindrical portion includes a protrusion protruding radially outward from an outer circumferential surface of the front cylindrical portion, and the inner cylindrical portion includes a recess in which the protrusion is disposed.

11. The power tool according to claim 9, wherein the output shaft includes an anvil, the power tool further comprises an impact mechanism to which a rotational force of the motor is transmitted via the speed reduction mechanism and that impacts the anvil in a rotation direction, and the gear case is a hammer case that accommodates therein the speed reduction mechanism and the impact mechanism.

12. A power tool comprising:

a motor;

an output shaft that is rotated by a rotational force of the motor; and a chip-on-board light emitting diode disposed around the output shaft, wherein the chip-on-board light emitting diode includes a substrate, an LED chip disposed on the substrate, a phosphor that covers the LED chip, and an electrode that is disposed on the substrate at a position spaced from the LED chip and is connected to a power supply via a lead wire, and the phosphor covers the electrode.

13. The power tool according to claim 12, wherein the LED chip and the electrode are disposed on a front surface of the substrate.

14. The power tool according to claim 13, wherein the chip-on-board light emitting diode includes a bank protruding forward from a front surface of the substrate and defining a compartment space in which the phosphor is disposed, and the LED chip and the electrode are disposed on an inner side of the bank.

15. The power tool according to claim 14, wherein the substrate includes a circular ring portion, the bank includes:

a circular ring shaped first bank provided on a front surface of the circular ring portion; and a circular ring shaped second bank provided radially outside with respect to the first bank on the front surface of the circular ring portion, the LED chip and the electrode are disposed between the first bank and the second bank, and the phosphor is disposed so as to cover each of the LED chip and the electrode between the first bank and the second bank.

16. The power tool according to claim 15, wherein the lead wire is connected to the electrode from a rear surface of the circular ring portion through a through hole provided in the circular ring portion.

17. The power tool according to claim 16, wherein the substrate includes a support portion protruding downward from a lower portion of the circular ring portion, and at least a part of the lead wire is supported by a rear surface of the support portion.

18. The power tool according to claim 17, further comprising a light cover that includes: an outer cylindrical portion disposed radially outside with respect to the circular ring portion; an inner cylindrical portion disposed radially inside with respect to the circular ring portion; a light transmission portion disposed so as to connect a front end portion of the outer cylindrical portion and a front end portion of the inner cylindrical portion and through which light emitted from the LED chip passes; and a protrusion protruding downward from a lower portion of the outer cylindrical portion, wherein the protrusion includes a housing portion in which the support portion is disposed.

19. The power tool according to claim 15, wherein a plurality of the LED chips are arranged at intervals in a circumferential direction of the circular ring portion.

20. The power tool according to claim 18, wherein the protrusion is provided with a notch in which the lead wire is disposed.

* * * * *